US012786382B2

(12) United States Patent
Kim

(10) Patent No.: US 12,786,382 B2
(45) **Date of Patent: *Nov. 3, 2026**

(54) IMAGE ENCODING/DECODING METHOD AND DEVICE

(71) Applicant: B1 INSTITUTE OF IMAGE TECHNOGLOGY, INC., Seoul (KR)

(72) Inventor: Ki Baek Kim, Daejeon (KR)

(73) Assignee: B1 INSTITUTE OF IMAGE TECHNOLOGY, INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/999,067

(22) Filed: Dec. 23, 2024

(65) Prior Publication Data

US 2025/0126245 A1 Apr. 17, 2025

Related U.S. Application Data

(63) Continuation of application No. 18/743,620, filed on Jun. 14, 2024, which is a continuation of application (Continued)

(30) Foreign Application Priority Data

Sep. 7, 2018 (KR) ........................ 10-2018-0107256

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/159* (2014.11); *H04N 19/176* (2014.11); *H04N 19/70* (2014.11)

(58) Field of Classification Search
CPC ............... H04N 19/132; H04N 19/105; H04N 19/159; H04N 19/176
See application file for complete search history.

(56) References Cited

U.S. PATENT DOCUMENTS 9,083,974 B2 7/2015 Jeon et al.
9,532,058 B2 12/2016 Chien et al.
(Continued)

FOREIGN PATENT DOCUMENTS

CN 102934446 A 2/2013
EA 029414 B1 10/2016
(Continued)

OTHER PUBLICATIONS

Bross, Benjamin, et al., "Versatile Video Coding (Draft 2)" JVET-K1001-v4, Joint Video Experts Team (JVET) of ITU-T SG 16 WP 3 and ISO/IEC JTC 1/SC 29/WG 11, 11th Meeting: Ljubljana, SI, Jul. 10-18, 2018. (pp. 1-21).
(Continued)

*Primary Examiner* — Hesham K Abouzahra
(74) *Attorney, Agent, or Firm* — NSIP Law

(57) ABSTRACT

Image encoding/decoding method and device according to the present invention enable deciding of an intra-screen prediction mode of a target block, generation of a prediction block of the target block on the basis of the intra-screen prediction mode, and correction of the generated prediction block.

8 Claims, 11 Drawing Sheets

Related U.S. Application Data

No. 18/095,740, filed on Jan. 11, 2023, now Pat. No. 12,052,415, which is a continuation of application No. 17/115,852, filed on Dec. 9, 2020, now Pat. No. 11,616,944, which is a continuation of application No. 17/115,060, filed on Dec. 8, 2020, now Pat. No. 11,128,859, which is a continuation of application No. PCT/KR2019/011648, filed on Sep. 9, 2019.

(51) Int. Cl.

| | |
|---|---|
| ***H04N 19/159*** | (2014.01) |
| ***H04N 19/176*** | (2014.01) |
| ***H04N 19/70*** | (2014.01) |

(56) References Cited

U.S. PATENT DOCUMENTS

| | | | | |
|---|---|---|---|---|
| 9,877,030 | B2 | 1/2018 | Song et al. | |
| 11,616,944 | B2 | 3/2023 | Kim | |
| 2012/0082223 | A1 | 4/2012 | Karczewicz et al. | |
| 2013/0107968 | A1 | 5/2013 | Sato | |
| 2013/0163664 | A1 | 6/2013 | Guo et al. | |
| 2014/0056352 | A1 | 2/2014 | Park et al. | |
| 2014/0092980 | A1 | 4/2014 | Guo et al. | |
| 2016/0037177 | A1 | 2/2016 | Park et al. | |
| 2017/0006293 | A1 | 1/2017 | Lee et al. | |
| 2018/0054618 | A1 | 2/2018 | Jeon et al. | |
| 2018/0098074 | A1 | 4/2018 | Heo et al. | |
| 2018/0234679 | A1 | 8/2018 | Heo et al. | |
| 2018/0309984 | A1 | 10/2018 | Son et al. | |
| 2018/0332284 | A1 | 11/2018 | Liu et al. | |
| 2019/0116381 | A1 | 4/2019 | Lee et al. | |
| 2019/0166375 | A1 | 5/2019 | Jun et al. | |
| 2019/0182481 | A1 | 6/2019 | Lee | |
| 2019/0191155 | A1 | 6/2019 | Ko et al. | |
| 2019/0222837 | A1 | 7/2019 | Lee et al. | |
| 2019/0281290 | A1 | 9/2019 | Lee et al. | |
| 2020/0059667 | A1 * | 2/2020 | Lee | H04N 19/167 |
| 2020/0275124 | A1 | 8/2020 | Ko et al. | |
| 2020/0288150 | A1 | 9/2020 | Jun et al. | |
| 2020/0413069 | A1 | 12/2020 | Lim et al. | |
| 2021/0014487 | A1 | 1/2021 | Choi et al. | |

FOREIGN PATENT DOCUMENTS

| | | | | | |
|---|---|---|---|---|---|
| JP | 2008-271371 | A | | 11/2008 | |
| JP | 2012-244354 | A | | 12/2012 | |
| JP | 2014-220785 | A | | 11/2014 | |
| JP | 2018-116925 | A | | 7/2018 | |
| KR | 10-2014-0093869 | A | | 7/2014 | |
| KR | 20140093869 | A | * | 7/2014 | H04N 19/51 |
| KR | 10-2014-0123008 | A | | 10/2014 | |
| KR | 10-2017-0104127 | A | | 9/2017 | |
| KR | 20170104127 | A | * | 9/2017 | H04N 19/593 |
| RU | 2 411 688 | C1 | | 2/2011 | |
| RU | 2 526 764 | C2 | | 8/2014 | |
| RU | 2 554 545 | C2 | | 2/2015 | |
| RU | 2 666 319 | C1 | | 9/2018 | |
| WO | WO 2008/084817 | A1 | | 7/2008 | |
| WO | WO 2012/087077 | A2 | | 6/2012 | |
| WO | WO 2012/096150 | A1 | | 7/2012 | |
| WO | WO 2016/155641 | A1 | | 10/2016 | |
| WO | WO 2018/116925 | A1 | | 6/2018 | |

OTHER PUBLICATIONS

Bross, Benjamin, et al., "WD4: Working Draft 4 of High-Efficiency Video Coding" JCTVC-F803_d6, Joint Collaborative Team on Video Coding (JCT-VC) of ITU-T SG16 WP3 and ISO/IEC JTC1/SC29/WG11, 6th Meeting: Torino, IT, Jul. 14-22, 2011. (pp. 1-17).

Consideration, "Test Model under Consideration for High Efficiency Video Coding (HEVC)" *ITU-T SG16 WP3 and ISO/IEC JTC1/SC29/WG11 2nd Meeting: Geneva, Switzerland, CH.* Document: JCTVC-B205, Jul. 21-28, 2010. (pp. 1-159).

International Search Report issued on Dec. 13, 2019, corresponds in International Patent Application No. PCT/KR2019/011648 (3 pages in English and 3 pages in Korean).

Jaja, Edward Tamunoiyowuna, et al. "Intra block prediction using first-second row non-directional samples in HEVC video coding." 2017 IEEE International Conference on Signal and Image Processing Applications (ICSIPA). IEEE, 2017. (pp. 1-6).

Jiang, Hui-Yu, and Yao-Jen Chang. "CE3-related: Advanced MPM based on intra reference line selection scheme." Joint Video Experts Team (JVET) of ITU-T SG 16, Jul. 10-18, 2018. (pp. 1-5).

Kanumuri et al. "Enhancements to Intra Coding" Document: JCTVC-D235, *4th Meeting Daegu, Korea.* Jan. 20-28, 2011. (pp. 1-8).

Rath, Gagan, F. Urban, and F. Racape. "CE3-related: Block Shape Adaptive Intra Prediction Directions." Joint Video Exploration Team (JVET) of ITU-T SG 16 WP 3 and ISO/IEC JTC 1/SC 29/WG 11, JVET-K0169, Jul. 10-18, 2018. (pp. 1-6).

Said, Amir, et al. "Position dependent prediction combination for intra-frame video coding." 2016 IEEE international conference on image processing (ICIP). IEEE, 2016. (pp. 1-5).

Shiodera et al., "Bidirectional Intra Prediction" *VCEG-AE14, ITU—Telecommunications Standardization Sector, 31st Meeting: Marrakech, MA.* Jan. 15-16, 2007. (pp. 1-6).

United States Office Action issued on Jan. 29, 2021, corresponds in U.S. Appl. No. 17/115,060 (26 pages in English).

United States Office Action issued on Feb. 12, 2021, corresponds in U.S. Appl. No. 17/115,852 (14 pages in English).

Van der Auwera, Geert. "Description of Core Experiment 3: Intra Prediction and Mode Coding, Joint Video Experts Team (JVET) of ITU-T SG 16 WP 3 and ISO/IEC JTC 1/SC 29/WG 11, Document: JVET-J1023_r2." 10th Meeting: San Diego, Apr. 10-20, 2018. (pp. 1-49).

Yao, Qiang, Kei Kawamura, and Sei Naito. "Prediction mode based reference line synthesis for intra prediction of video coding." 2017 25th European Signal Processing Conference (EUSIPCO). IEEE, 2017. (pp. 1-5).

Yu, Yue, et al., "On MPM determination and Planar mode signaling" JCTVC-H0516-r3, Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012. (pp. 1-7).

Shiodera, Taichiro, et al., "Bidirectional Intra Prediction", Video Coding Experts Group (VCEG), Jan. 2007, (6 Pages in English).

Ahn, Yongjo, et al., "CE10-related: Diagonal motion partitions on top of MTT block structure", Digital Insights Inc., JVET-K0270, Jul. 10-18, 2018, (6 Pages in English).

Jiang, Hui-Yu, et al., "CE3-related: Advanced MPM based on intra reference line selection scheme", Foxconn, JVET-K0175-v3, Jul. 10-18, 2018, (4 Pages in English, 1 Page in Japanese).

Liao, Ru-Ling, et al., "CE10: Triangular prediction unit mode (CE10.3.1 and CE10.3.2)", Panasonic, JVET-K0144-v1, Jul. 10-18, 2018, (6 Pages in English).

Li, Guichun, et al., "Integration of Plane Mode in Unified Intra Prediction", Joint Collaborative Team on Video Coding (JCT-VC) of ITU-T SG16 WP3 and ISO/IEC JTC1/SC29/WG11, Santa Clara University & Hisilicon Technologies Co., Ltd., Oct. 7-15, 2010, (5 Pages in English).

* cited by examiner

【FIG. 1】
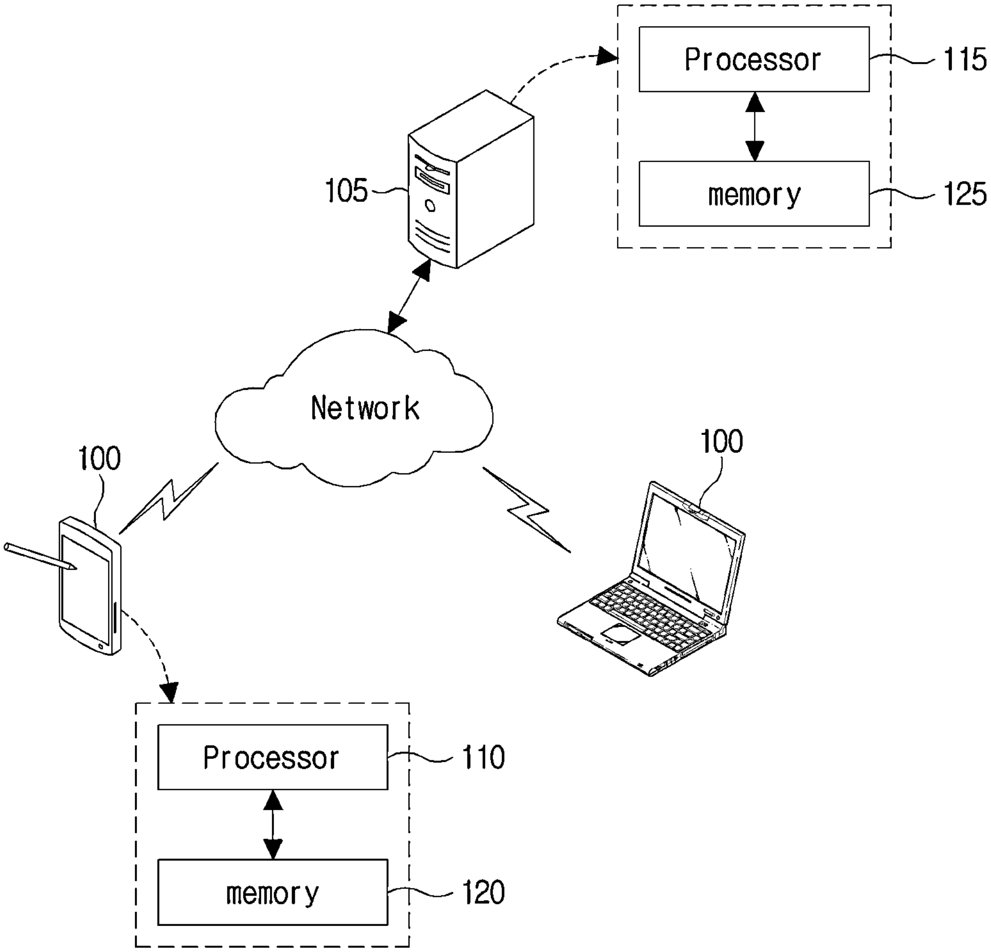

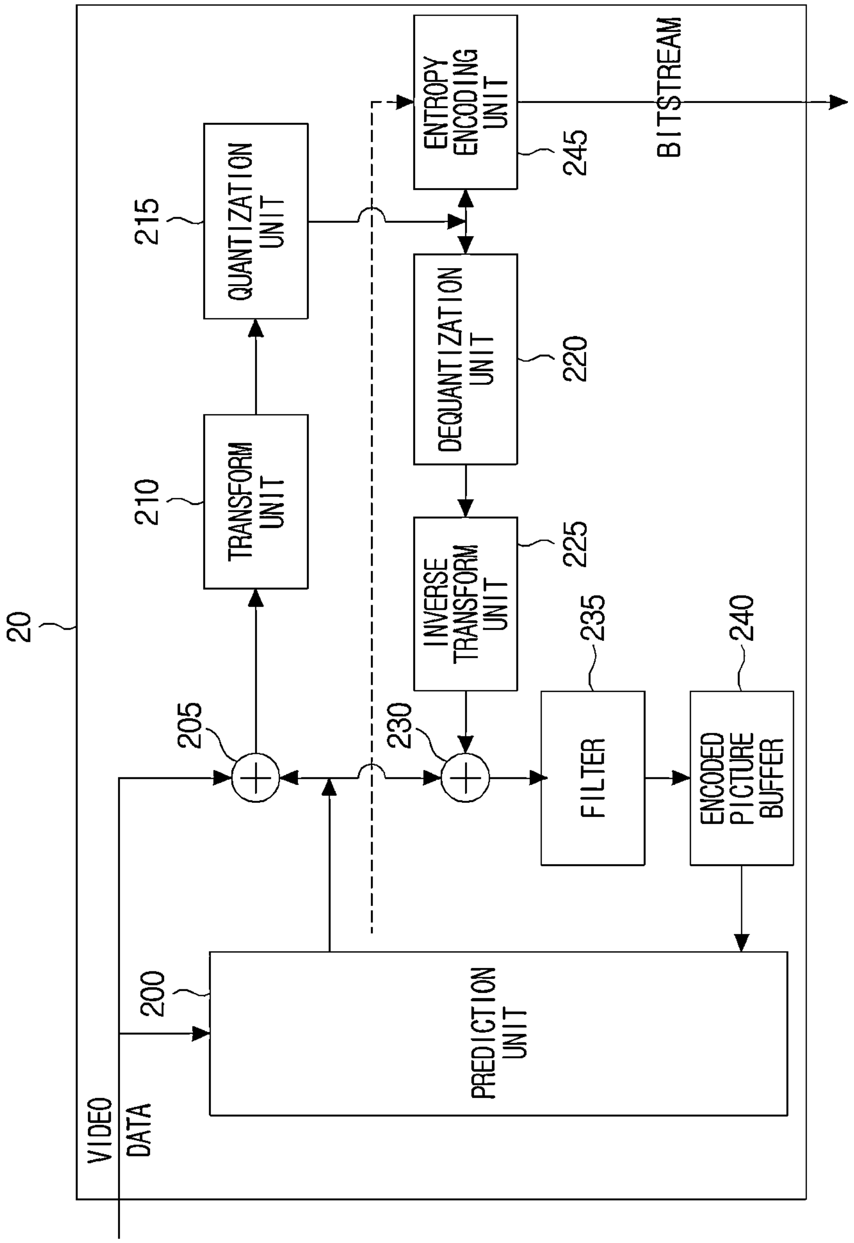
【FIG. 2】

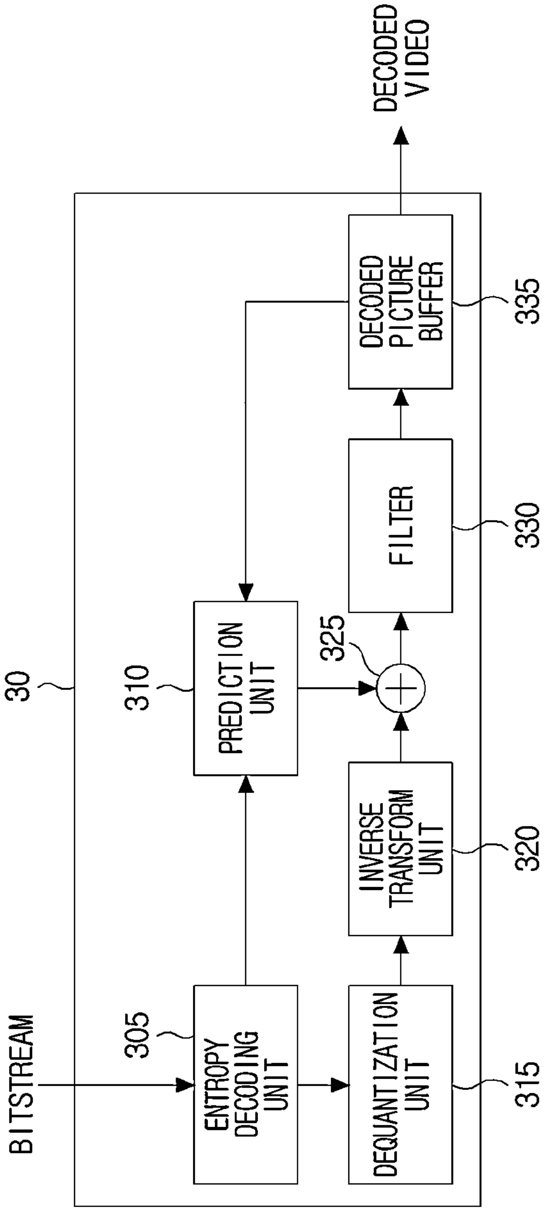
【FIG. 3】

【FIG. 4】
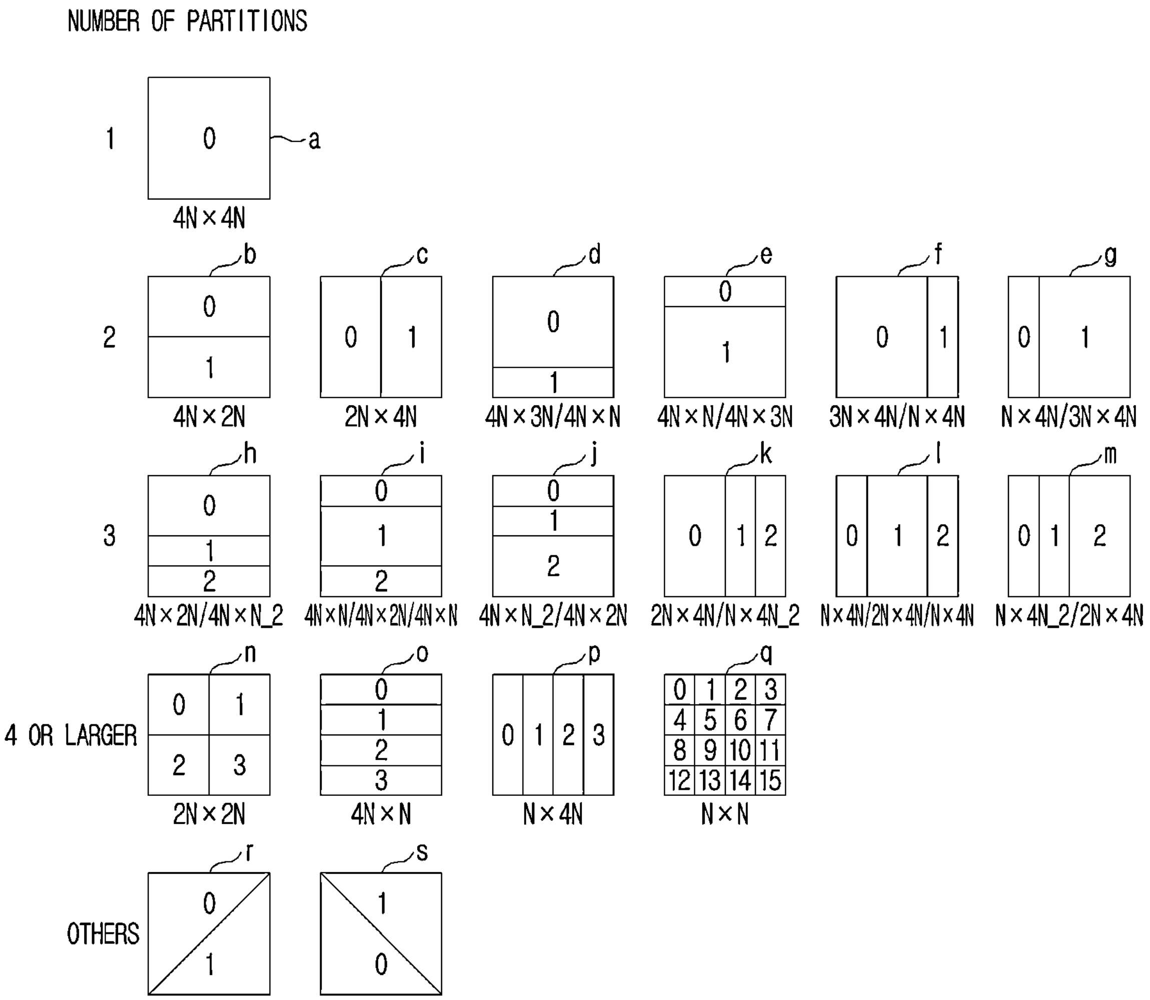

【FIG. 5】
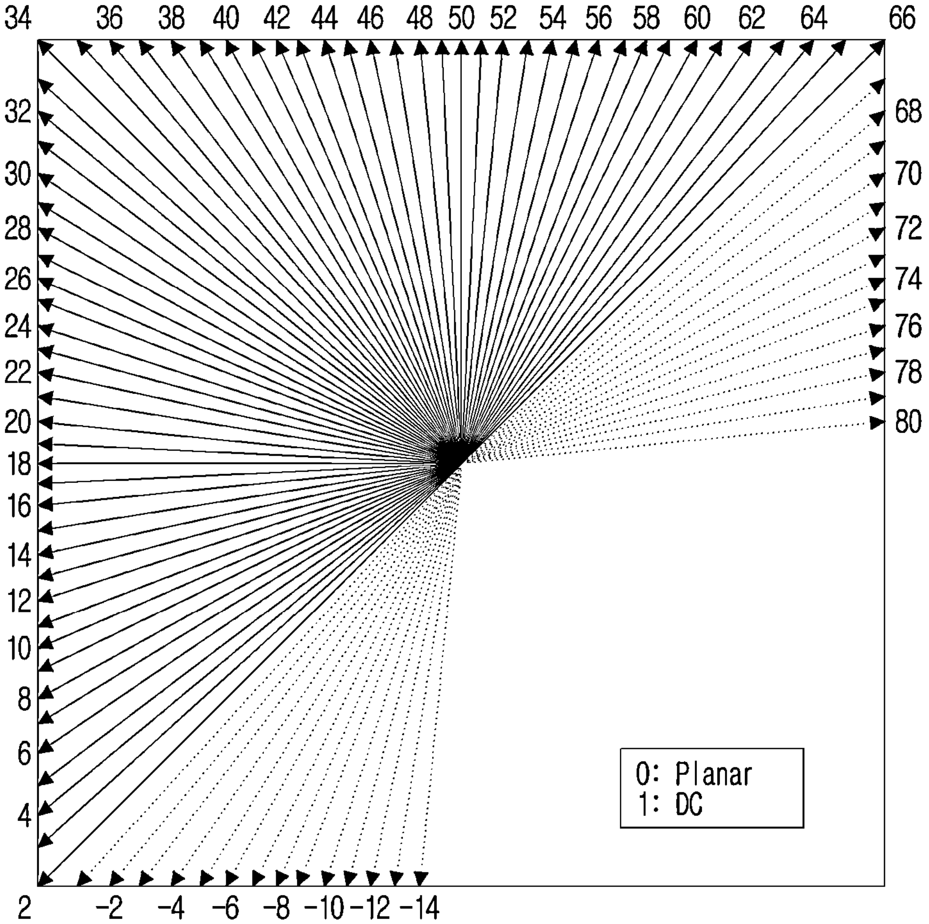
【FIG. 6】
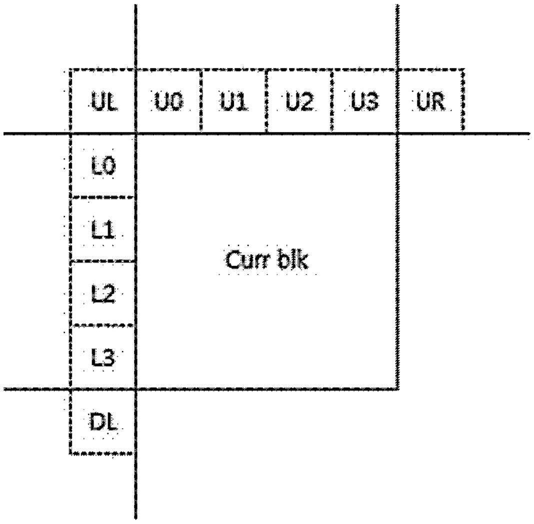

【FIG. 7】
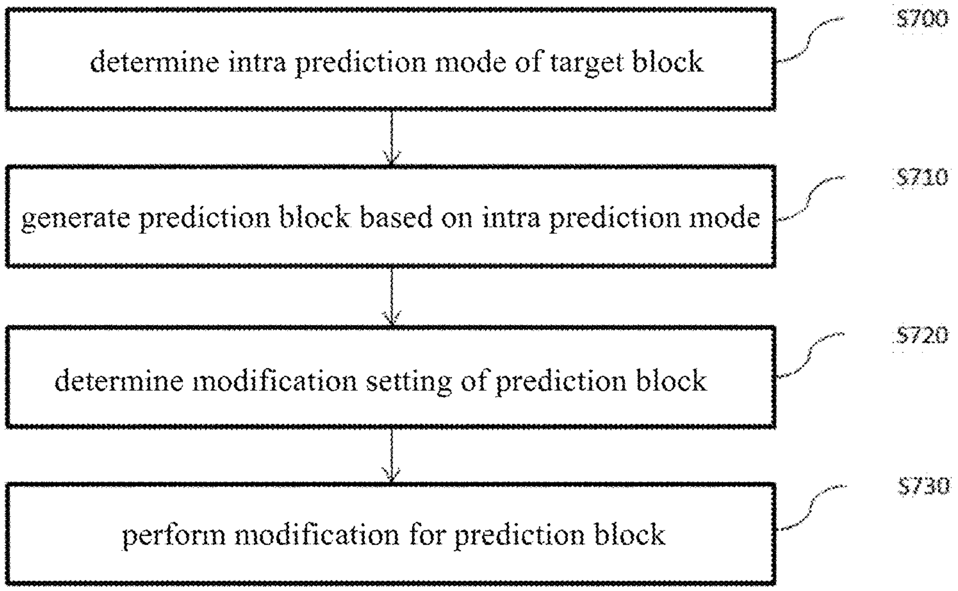
【FIG. 8】
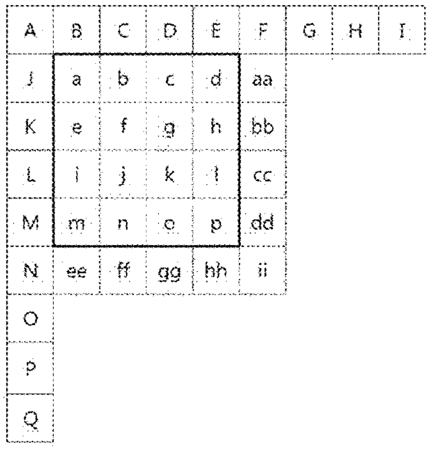

【FIG. 9A】
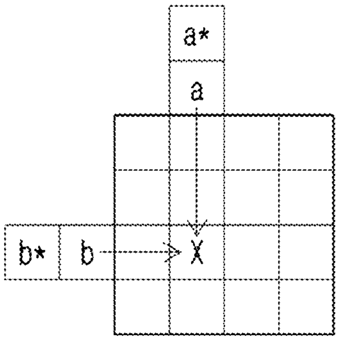
【FIG. 9B】
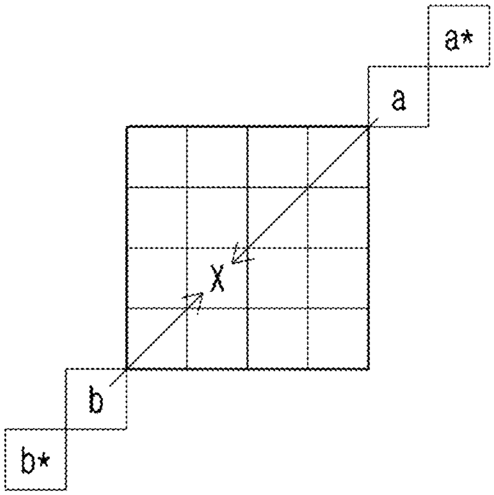

【FIG. 10】
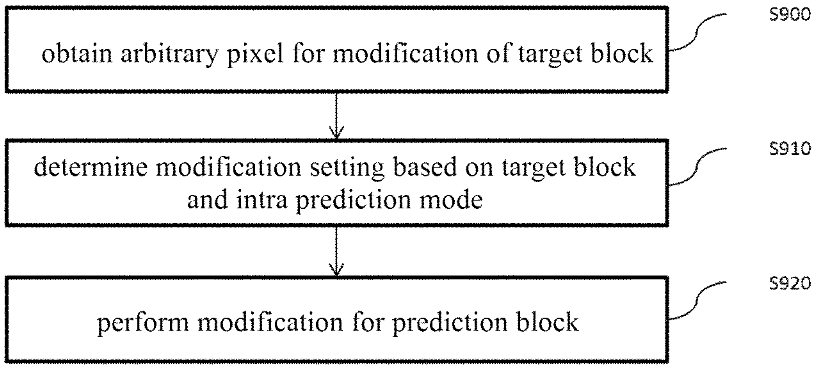

【FIG. 11A】
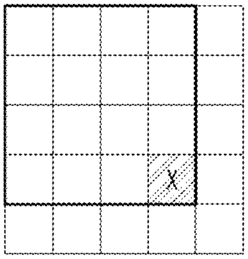
【FIG. 11B】
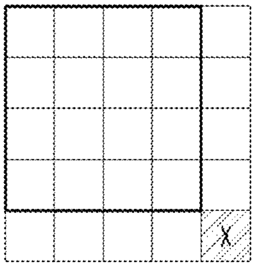
【FIG. 11C】
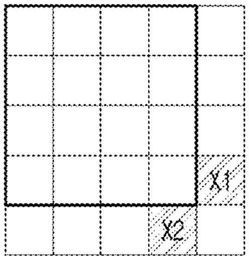
【FIG. 11D】
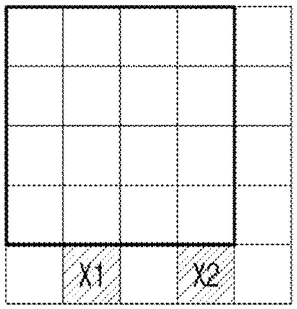

【FIG. 11E】
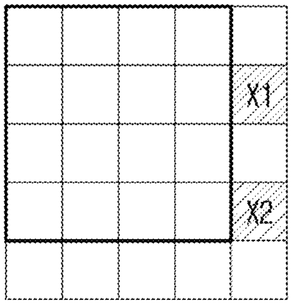
【FIG. 12A】
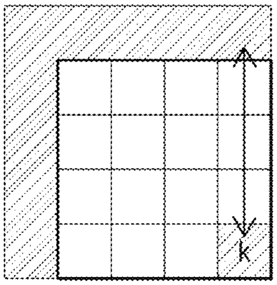
【FIG. 12B】
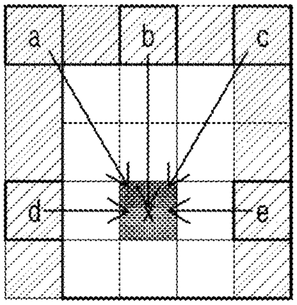
【FIG. 12C】
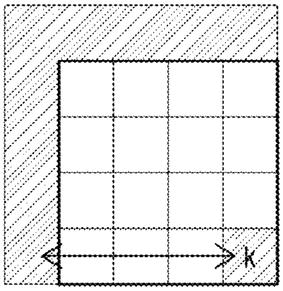

【FIG. 12D】
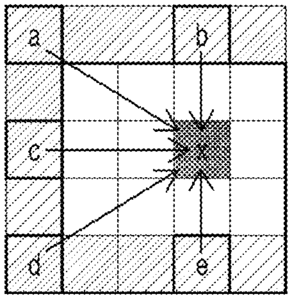
【FIG. 12E】
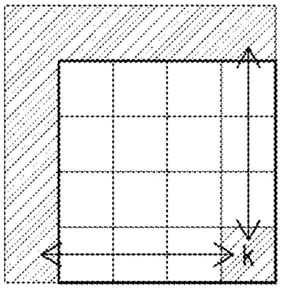
【FIG. 12F】
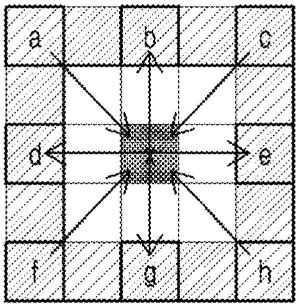

IMAGE ENCODING/DECODING METHOD AND DEVICE

CROSS REFERENCE TO RELATED APPLICATIONS

This Application is a Continuation Application of U.S. patent application Ser. No. 18/743,620 filed on Jun. 14, 2024, which is a Continuation Application of U.S. patent application Ser. No. 18/095,740, filed on Jan. 11, 2023, now U.S. Pat. No. 12,052,415 issued on Jul. 30, 2024, which is a Continuation Application of U.S. patent application Ser. No. 17/115,852, filed on Dec. 9, 2020, which is now U.S. Pat. No. 11,616,944, which is a Continuation Application of U.S. patent application Ser. No. 17/115,060, filed on Dec. 8, 2020, which is now U.S. Pat. No. 11,128,859, which pursuant to 35 U.S.C. §§ 120 and 365(c), is a Bypass Continuation of International Application No. PCT/KR2019/011648, filed on Sep. 9, 2019, which claims the benefit under 35 U.S.C. §§ 119(a) and 365(b) of Korean Patent Application No. 10-2018-0107256, filed on Sep. 7, 2018, in the Korean Intellectual Property Office, the entire disclosure of which is incorporated herein by reference for all purposes.

TECHNICAL FIELD

The present disclosure relates to an image encoding/decoding method and device.

BACKGROUND ART

As the Internet and mobile terminals have been supplied and information and communication technologies have been developed, the use of multimedia data has rapidly increased. Accordingly, a need for improving the performance and efficiency of an image processing system has considerably increased to perform a variety of services or works through image prediction in all kinds of systems, but results from research and development which may respond to this atmosphere have been not enough.

As such, in the image encoding and decoding method and device of a traditional technology, it is required to improve performance for image processing, especially for image encoding or image decoding.

DISCLOSURE

Technical Problem

A purpose of the present disclosure is to provide a method and a device for deriving an intra prediction mode according to a color component.

A purpose of the present disclosure is to provide a method and a device for configuring a reference pixel for intra prediction.

A purpose of the present disclosure is to provide an image encoding/decoding method and device for modifying intra prediction with an arbitrary pixel.

Technical Solution

An image encoding/decoding method and device according to the present disclosure may determine an intra prediction mode of a target block, generate a prediction block of the target block based on the intra prediction mode and modify the prediction block.

In an image encoding/decoding method and device according to the present disclosure, an intra prediction mode of the target block may be determined as a mode in a prediction mode candidate group according to state information of the target block.

In an image encoding/decoding method and device according to the present disclosure, when the color component of the target block is a luma component, a prediction mode candidate group composed of a directional mode and a non-directional mode may be referred to and when the color component of the target block is a chroma component, a prediction mode candidate group in which at least one of a directional mode, a non-directional mode, a color mode or a color copy mode is supported may be referenced to.

In an image encoding/decoding method and device according to the present disclosure, the prediction mode candidate group may be classified into a plurality of categories by considering the maximum number or the priority of a prediction mode which is capable of being included in each category.

In an image encoding/decoding method and device according to the present disclosure, the prediction mode candidate group may be classified into a first category including a non-directional mode and a directional mode and a second category including a color copy mode.

In an image encoding/decoding method and device according to the present disclosure, the first information specifying any one of a plurality of categories may be obtained and the second information specifying an intra prediction mode of the target block in a category according to the first information may be obtained.

In an image encoding/decoding method and device according to the present disclosure, an intra prediction mode of the target block may be determined from the specified category based on the first information and the second information.

In an image encoding/decoding method and device according to the present disclosure, the second information may not be obtained when only one prediction mode is included in the category according to the first information.

In an image encoding/decoding method and device according to the present disclosure, configuring a reference pixel used for the intra prediction may be further included, but the reference pixel may belong to all or part of plural reference pixel lines supported in a decoding device.

In an image encoding/decoding method and device according to the present disclosure, performing at least one of a weighted filter or an interpolation filter for the configured reference pixel may be further included.

In an image encoding/decoding method and device according to the present disclosure, modifying the prediction block may be selectively performed based on predetermined coding information and the coding information may include at least one of an image type, a color component, state information, an encoding mode, an intra prediction mode, whether intra prediction in units of sub-blocks is applied or a reference pixel line.

Advantageous Effects

According to the present disclosure, an intra prediction mode may be effectively derived.

According to the present disclosure, the efficiency of intra prediction may be improved by the selective use of a reference pixel line and a predetermined filtering.

According to the present disclosure, the accuracy of intra prediction and coding performance may be improved by modifying a prediction block.

DESCRIPTION OF DRAWINGS

FIG. 1 is a conceptual diagram on an image encoding and decoding system according to an embodiment of the present disclosure.

FIG. 2 is a component block diagram on an image encoding device according to an embodiment of the present disclosure.

FIG. 3 is a component block diagram on an image decoding device according to an embodiment of the present disclosure.

FIG. 4 is an exemplary diagram showing various partition shapes which may be obtained in the block partition unit of the present disclosure.

FIG. 5 is an exemplary diagram showing a prediction mode in intra prediction according to an embodiment of the present disclosure.

FIG. 6 is an arrangement diagram on a target block and a block adjacent thereto according to an embodiment of the present disclosure.

FIG. 7 is a flow chart showing the modification method of intra prediction according to an embodiment of the present disclosure.

FIG. 8 is an arrangement diagram on the pixel of a target block and an adjacent block according to an embodiment of the present disclosure.

FIGS. 9A and 9B are exemplary diagrams on a modification method based on multiple reference pixel lines according to an embodiment of the present disclosure.

FIG. 10 is a flow chart showing the modification method of intra prediction according to an embodiment of the present disclosure.

FIGS. 11A, 11B, 11C, 11D and 11E are exemplary diagrams on an arbitrary pixel used to modify a prediction pixel according to an embodiment of the present disclosure.

FIGS. 12A, 12B, 12C, 12D, 12E and 12F are exemplary diagrams in which modification is performed based on an arbitrary pixel according to an embodiment of the present disclosure.

BEST MODE

An image encoding/decoding method and device according to the present disclosure may determine an intra prediction mode of a target block, generate a prediction block of the target block based on the intra prediction mode and modify the prediction block.

In an image encoding/decoding method and device according to the present disclosure, an intra prediction mode of the target block may be determined as a mode in a prediction mode candidate group according to state information of the target block.

In an image encoding/decoding method and device according to the present disclosure, when the color component of the target block is a luma component, a prediction mode candidate group composed of a directional mode and a non-directional mode may be referenced and when the color component of the target block is a chroma component, a prediction mode candidate group in which at least one of a directional mode, a non-directional mode, a color mode or a color copy mode is supported may be referenced.

In an image encoding/decoding method and device according to the present disclosure, the prediction mode candidate group may be classified into a plurality of categories by considering a maximum number or a priority of prediction modes which may be included in each category.

In an image encoding/decoding method and device according to the present disclosure, the prediction mode candidate group may be classified into a first category including a non-directional mode and a directional mode and a second category including a color copy mode.

In an image encoding/decoding method and device according to the present disclosure, the first information specifying any one of a plurality of categories may be obtained and the second information specifying an intra prediction mode of the target block in the category according to the first information may be obtained.

In an image encoding/decoding method and device according to the present disclosure, an intra prediction mode of the target block may be determined from the specified category based on the first information and the second information.

In an image encoding/decoding method and device according to the present disclosure, the second information may not be obtained when only one prediction mode is included in the category according to the first information.

In an image encoding/decoding method and device according to the present disclosure, configuring a reference pixel used for the intra prediction may be further included, but the reference pixel may belong to all or part of a plurality of reference pixel lines supported in a decoding apparatus.

In an image encoding/decoding method and device according to the present disclosure, performing at least one of a weighted filter or an interpolation filter for the configured reference pixel may be further included.

In an image encoding/decoding method and device according to the present disclosure, modifying the prediction block may be selectively performed based on predetermined coding information and the coding information may include at least one of an image type, a color component, state information, a coding mode, an intra prediction mode, whether intra prediction in a sub-block unit is applied or a reference pixel line.

Mode or Invention

The present invention may be changed and modified variously and be illustrated with reference to different exemplary embodiments, some of which will be described and shown in the drawings. However, these embodiments are not intended for limiting the invention but are construed as including includes all modifications, equivalents and replacements which belong to the spirit and technical scope of the invention. Like reference numerals in the drawings refer to like elements throughout.

Although the terms first, second, etc. may be used to describe various elements, these elements should not be limited by these terms. These terms are used only to distinguish one element from another element. For example, a first element could be termed a second element and a second element could be termed a first element likewise without departing from the teachings of the present invention. The term "and/or" includes any and all combinations of a plurality of associated listed items.

It will be understood that when an element is referred to as being "connected to" or "coupled to" another element, the element can be directly connected or coupled to another element or intervening elements. On the contrary, when an element is referred to as being "directly connected to" or "directly coupled to" another element, there are no intervening elements present.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein including technical or scientific terms mean the same as generally understood by those with ordinary skills in the art to which the present disclosure pertains. The terms which are generally used and are defined in a dictionary should be interpreted as having the same contextual meaning as a related technology and unless clearly defined in the present disclosure, they are not interpreted as being ideal or excessively formal.

Generally, one or more color spaces may be configured according to a color format of an image. One or more pictures with a certain size or, one or more pictures with a different size may be configured according to the color format. In an example, in a YCbCr color configuration, a color format such as 4:4:4, 4:2:2, 4:2:0, Monochrome (configured with only Y), etc. may be supported. In an example, for YCbCr 4:2:0, 1 luma component (in this example, Y) and 2 chroma components (in this example, Cb/Cr) may be configured and in this case, a configuration ratio of a chroma component and a luma component may be an aspect ratio of 1:2. In an example, for 4:4:4, it may have the same aspect ratio. When it is configured with one or more color spaces as in the above example, a picture may perform partition into each color space.

As an image may be classified into I, P, B, etc. according to an image type (e.g., a picture type, a slice type, a tile group type, a tile type, a brick type, etc.), an image type I may mean an image which is self-encoded without using a reference picture, an image type P may mean an image which is encoded by using a reference picture, but allows only forward prediction and an image type B may mean an image which is encoded by using a reference picture and allows a forward/backward prediction, but a part of the above types may be combined according to a coding setting (combining P and B) or an image type in other configuration may be supported.

A variety of encoded/decoded information generated in the present disclosure may be explicitly or implicitly processed. In this connection, it may be understood that an explicit processing generates encoded/decoded information in a sequence, a slice, a tile group, a tile, a brick, a block, a sub-block, etc. to store it in a bitstream and parses related information in the same unit as an encoder in a decoder to reconstruct it into decoded information. In this case, it may be understood that an implicit processing processes encoded/decoded information in the same process, rule, etc. in an encoder and a decoder.

FIG. 1 is a conceptual diagram on an image encoding and decoding system according to an embodiment of the present disclosure.

In reference to FIG. 1, an image encoding device 105 and decoding device 100 may be a user terminal such as a personal computer (PC), a notebook, a personal digital assistant (PDA), a portable multimedia player (PMP), a PlayStation Portable (PSP), a wireless communication terminal, a smart phone or TV, etc. or a server terminal such as an application server, a service server, etc. and may include various devices equipped with a communication device such as a communication modem, etc. for communicating with various instruments or an wire and wireless communication network, a memory (120, 125) for storing all kinds of programs and data for inter or intra prediction to encode or decode an image or a processor (110, 115) for program operation and control by running it, etc.

In addition, an image encoded in a bitstream by an image encoding device 105 may be transmitted to an image decoding device 100 through a wire and wireless communication network, etc. such as the Internet, a wireless local area network, a wireless Lan network, a wibro network or a mobile radio communication network, etc. or through various communication interfaces such as a cable or an universal serial bus, etc. in real-time or in non-real-time and decoded in an image decoding device 100. And it may be reconstructed into an image and played. In addition, an image encoded in a bitstream by an image encoding device 105 may be transmitted to an image decoding device 100 from an image encoding device 105 through a computer-readable recording medium.

The above-mentioned image encoding device and image decoding device may be separate devices, respectively, but they may be made as one image encoding/decoding device according to an embodiment. In this case, some configurations of an image encoding device may be embodied to include at least the same structure or perform at least the same function as some configurations of an image decoding device as a substantially identical technical element.

Accordingly, in a detailed explanation on the following technical elements and their operating principles, etc., an overlapping explanation on the corresponding technical elements will be omitted. In addition, as an image decoding device corresponds to a computing device which applies an image encoding method performed in an image encoding device to decoding, an image encoding device will be mainly described as follows.

A computing device may include a memory which stores a program or a software module embodying an image encoding method and/or an image decoding method and a processor which is connected to a memory to execute a program. In this case, an image encoding device may be referred to as an encoder and an image decoding device may be referred to as a decoder, respectively.

FIG. 2 is a component block diagram on an image encoding device according to an embodiment of the present disclosure.

In reference to FIG. 2, an image encoding device 20 may include a prediction unit 200, a subtraction unit 205, a transform unit 210, a quantization unit 215, a dequantization unit 220, an inverse transform unit 225, an add unit 230, a filter unit 235, an encoding picture buffer 240 and an entropy encoding unit 245.

A prediction unit 200 may be embodied by using a prediction module, a software module, and may generate a prediction block in an intra prediction method or an inter prediction method for a block which will be encoded. A prediction unit 200 may generate a prediction block by predicting a target block which is currently to be encoded in an image. In other words, a prediction unit 200 may generate a prediction block with the predicted pixel value of each pixel generated by predicting the pixel value of each pixel in a target block which is to be encoded in an image according to intra prediction or inter prediction. In addition, a prediction unit 200 may make an encoding unit encode information on a prediction mode by transmitting information necessary to generate a prediction block like information on a prediction mode such as an intra prediction mode or an inter prediction mode to an encoding unit. In this case, a processing unit in which prediction is performed and a processing unit in which a prediction method and a concrete content are determined may be determined according to an encoding setting. For example, a prediction method, a prediction mode, etc. may be determined in a prediction unit and prediction may be performed in a transform unit.

In an inter prediction unit, it may be divided into a temporal prediction and a spatial prediction based on a reference picture. For a temporal prediction, it may be a prediction method finding a motion in a picture which is temporally different from a current picture and for a spatial prediction, it may be a prediction method finding a motion in a current picture (an encoded region. a preset region adjacent to a target block) which is temporally the same as a current picture. It may be integrated and managed by a reference picture list or may be managed by dividing an encoding mode.

In addition, in an inter prediction unit, it may be divided into a translation motion model and a non-translation motion model according to a motion prediction method. For a translation motion model, a prediction may be performed by considering only parallel translation and for a non-translation motion model, a prediction may be performed by considering a motion such as rotation, distance, zoom in/out, etc. as well as parallel translation. When a unidirectional prediction is assumed, a translation motion model may need one motion vector, but a non-translation motion model may need one or more motion information (e.g., one motion vector+rotation angle/scale factor, more than 2 motion vectors, etc. The following assumes the use of more than 2 motion vectors). For a non-translation motion model, each motion vector may be information applied to the preset position of a target block such as the left-top vertex, the right-top vertex, the left-bottom vertex, etc. of a target block and may obtain the position of a target block region to be predicted by a corresponding motion vector in a pixel unit or a sub-block unit (an integer over 2 like 4×4, 8×8). For an inter prediction unit, some processes described later according to the motion model may be commonly applied and some processes may be separately applied.

An inter prediction unit may include a reference picture construction unit, a motion prediction unit, a motion compensation unit, a motion information determination unit and a motion information encoding unit. A reference picture construction unit may include a picture encoded before or after a current picture in a reference picture list (L0, L1). It may obtain a prediction block from a reference picture included in the reference picture list and may be included in at least one of reference picture lists as a current image is configured with a reference picture according to an encoding setting.

In an inter prediction unit, a reference picture construction unit may include a reference picture interpolation unit and perform an interpolation process for a decimal pixel according to interpolation accuracy. For example, a DCT-based 8-tap interpolation filter may be applied for a luma component and a DCT-based 4-tap interpolation filter may be applied for a chroma component.

In an inter prediction unit, a motion prediction unit is a process of searching a block with high correlation with a target block through a reference picture and may use a variety of methods such as FBMA (Full search-based block matching algorithm), TSS (Three step search), etc. and a motion compensation unit means a process of obtaining a prediction block by a motion prediction process.

In an inter prediction mode, a motion information determination unit may perform a process for selecting the optimum motion information of a target block and motion information may be encoded by a motion information coding mode such as a skip mode, a merge mode, a competition mode, etc. The mode may be configured by combining modes supported according to a motion model and a skip mode (translation), a skip mode (non-translation), a merge mode (translation), a merge mode (non-translation), a competition mode (translation) and a competition mode (non-translation) may be an example therefor. Some of the modes may be included in a candidate group according to an encoding setting.

The motion information coding mode may obtain a prediction value for the motion information (a motion vector, a reference picture, a prediction direction, etc.) of a target block in at least one candidate block and when two or more candidate blocks are supported, optimum candidate selection information may be generated. In a skip mode (no residual signal) and a merge mode (with a residual signal), the prediction value may be used as the motion information of a target block and in a competition mode, the motion information of a target block and difference value information with the prediction value may be generated.

A candidate group for the motion information prediction value of a target block may be adaptively and variously configured according to a motion information coding mode. The motion information of a block spatially adjacent to a target block (e.g., a left block, a top block, a left-top block, a right-top block, a left-bottom block, etc.) may be included in a candidate group, the motion information of a block temporally adjacent to a target block (e.g., a left block, a right block, a top block, a bottom block, a left-top block, a right-top block, a left-bottom block, a right-bottom block, etc. including a block<central> in other image responding or corresponding to a target block) may be included in a candidate group and the mixed motion information of a spatial candidate and a temporal candidate (e.g., information obtained by an average, a central value, etc. of more than 2 candidates through the motion information of a block adjacent spatially and the motion information of a block adjacent temporally. Motion information may be obtained in a target block unit or in a sub-block unit for a target block) may be included in a candidate group.

There may be a priority for configuring a motion information prediction value candidate group. The order included in a prediction value candidate group configuration may be determined according to the priority and a candidate group may be configured when the number of candidate groups (determined according to a motion information coding mode) is reached according to the priority. In this case, the priority may be determined in the order of the motion information of a spatially adjacent block, the motion information of a temporally adjacent block and the mixed motion information of a spatial candidate and a temporal candidate, but it may be also modified.

For example, among spatially adjacent blocks, it may be included in a candidate group in the order of a left-top-right-top-left-bottom-left-top block, etc. and for temporally adjacent blocks, it may be included in a candidate group in the order of a right-bottom-middle-right-bottom block, etc.

A subtraction unit 205 may generate a residual block by subtracting a prediction block from a target block. In other words, a subtraction unit 205 may generate a residual block, a block-shaped residual signal, by calculating difference between a pixel value for each pixel of a target block to be encoded and a predicted pixel value for each pixel of a prediction block generated in a prediction unit. In addition, a subtraction unit 205 may generate a residual block in a unit except for a block unit obtained in a block partition unit described later.

A transform unit 210 may transform a signal belonging to a spatial domain into a signal belonging to a frequency domain and a signal obtained in a transform process is referred to as a transformed coefficient. For example, a transform block having a transformed coefficient may be obtained by transforming a residual block having a residual signal transmitted from a subtraction unit and an input signal is determined according to a coding setting, which is not limited to a residual signal.

A transform unit may transform a residual block by using a transform method such as Hadamard Transform, DST Based-Transform (Discrete Sine Transform), DCT Based-Transform (Discrete Cosine Transform), etc. and various transform methods improved and modified thereof may be used without being limited thereto.

At least one transform method among the transform methods may be supported and at least one detailed transform method in each transform method may be supported. In this case, the detailed transform method may be a transform method in which a part of a base vector is differently configured in each transform method.

For example, for DCT, more than 1 detailed transform methods between DCT-1 to DCT-8 may be supported and for DST, more than 1 detailed transform methods between DST-1 to DST-8 may be supported. A transform method candidate group may be configured by configuring a part of the detailed transform method. In an example, DCT-2, DCT-8 and DST-7 may be configured as a transform method candidate group to perform transform.

Transform may be performed in a horizontal/vertical direction. For example, the pixel value of a spatial domain may be transformed into a frequency domain by performing a total of two-dimensional transforms, one-dimensional transform in a horizontal direction with the transform method of DCT-2 and one-dimensional transform in a vertical direction with the transform method of DST-7.

Transform may be performed by using one fixed transform method or by adaptively selecting a transform method according to a coding setting. In this case, for an adaptive case, a transform method may be selected by using an explicit or implicit method. For an explicit case, each transform method selection information or transform method set selection information applied to a horizontal and vertical direction may be generated in a unit of a block, etc. For an implicit case, a coding setting may be defined according to an image type (I/P/B), a color component, a block size/shape/position, an intra prediction mode, etc. and accordingly, a predetermined transform method may be selected.

In addition, some transforms may be omitted according to a coding setting. In other words, it means more than one of horizontal/vertical units may be explicitly or implicitly omitted.

In addition, a transform unit may transmit information needed to generate a transform block to an encoding unit to encode it and store information thereof in a bitstream to transmit it to a decoder, and the decoding unit of a decoder may parse information therefor to use it in an inverse transform process.

A quantization unit 215 may quantize an input signal and in this case, a signal obtained in a quantization process is referred to as a quantized coefficient. For example, a quantization block with a quantized coefficient may be obtained by quantizing a residual block with a residual transformed coefficient transmitted from a transform unit and an input signal is determined according to a coding setting, which is not limited to a residual transformed coefficient.

A quantization unit may quantize a transformed residual block by using a quantization method such as Dead Zone Uniform Threshold Quantization, Quantization Weighted Matrix, etc. and various quantization methods improved and modified thereof may be used without being limited thereto.

A quantization process may be omitted according to a coding setting. For example, a quantization process may be omitted (including an inverse process) according to a coding setting (e.g., a quantization parameter is 0. i.e., lossless compression environment). In another example, a quantization process may be omitted when compression performance through quantization is not shown according to the characteristics of an image. In this case, a region in which a quantization process is omitted among quantization blocks (M×N) may be all or part of regions (M/2×N/2, M×N/2, M/2×N, etc.) and quantization omission selection information may be implicitly or explicitly determined.

A quantization unit may transmit information needed to generate a quantization block to an encoding unit to encode it and store information thereof in a bitstream to transmit it to a decoder and the decoding unit of a decoder may parse information therefor to use it for a dequantization process.

In the above example, it was described on the assumption that the residual block is transformed and quantized by the transform unit and the quantization unit, but the residual block with a transformed coefficient may be generated by transforming the residual signal of the residual block and the quantization process may not be performed, only a quantization process may be performed without transforming the residual signal of the residual block into a transformed coefficient, and both the transform process and the quantization process may not be performed. It may be determined according to a coding setting.

A dequantization unit 200 dequantizes a residual block quantized by a quantization unit 215. In other words, a dequantization unit 220 generates a residual block having a frequency coefficient by dequantizing a quantized frequency coefficient column.

An inverse transform unit 225 inversely transforms a residual block dequantized by a dequantization unit 220. In other words, an inverse transform unit 225 generates a residual block which has a pixel value by inversely transforming the frequency coefficients of a dequantized residual block, i.e., a reconstructed residual block. In this case, an inverse transform unit 225 may perform inverse transform by inversely using a transform method used in a transform unit 210.

An add unit 230 reconstructs a target block by adding a prediction block predicted in a prediction unit 200 and a residual block reconstructed by an inverse transform unit 225. The reconstructed target block may be stored as a reference picture (or a reference block) in an encoding picture buffer 240 and may be used as a reference picture when encoding the next block of a target block, other block or other picture in the future.

A filter unit 235 may include one or more postprocessing filter processes such as a deblocking filter, SAO (Sample Adaptive Offset), ALF (Adaptive Loop Filter), etc. A deblocking filter may remove block distortion that is generated on the boundary between blocks in a reconstructed picture. ALF may perform filtering based on a value obtained by comparing a reconstructed image after a block is filtered through a deblocking filter with an original image. SAO may reconstruct an offset difference with an original image in a pixel unit for a residual block in which a deblocking filter is applied. Such a postprocessing filter may be applied to a reconstructed picture or block.

An encoding picture buffer 240 may store a block or a picture reconstructed in a filter unit 235. A reconstructed block or picture stored in an encoding picture buffer 240 may be provided to a prediction unit 200 performing intra prediction or inter prediction.

An entropy encoding unit 245 scans a generated quantized frequency coefficient column according to various scanning methods to generate a quantized coefficient column and encodes and outputs it by using an entropy encoding method, etc. A scanning pattern may be set as one of various patterns such as a zigzag, a diagonal line, a raster, etc. In addition, encoding data including encoding information transmitted from each construction unit may be generated and output in a bitstream.

FIG. 3 is a component block diagram on an image decoding device according to an embodiment of the present disclosure.

In reference to FIG. 3, an image decoding device 30 may be configured by including an entropy decoding unit 305, a prediction unit 310, a dequantization unit 315, an inverse transform unit 320, an adder-subtractor 325, a filter 330 and a decoding picture buffer 335.

In addition, a prediction unit 310 may be configured by including an intra prediction module and an inter prediction module.

First, when an image bitstream transmitted from an image encoding device 20 is received, it may be transmitted to an entropy decoding unit 305.

An entropy decoding unit 305 may decode decoding data including coefficients quantized by decoding a bitstream and decoding information transmitted to each construction unit.

A prediction unit 310 may generate a prediction block based on data transmitted from an entropy decoding unit 305. In this case, based on a reference image stored in a decoded picture buffer 335, a reference picture list using a default configuration method may be configured.

An inter prediction unit may include a reference picture construction unit, a motion compensation unit and a motion information decoding unit and some may perform the same process as an encoder and some may perform an inversely deriving process.

A dequantization unit 315 may dequantize quantized transformed coefficients which are transmitted in a bitstream and decoded in an entropy decoding unit 305.

An inverse transform unit 320 may generate a residual block by applying inverse DCT, inverse integer transform or inverse transform methods similar thereto to a transformed coefficient.

In this case, a dequantization unit 315 and an inverse transform unit 320 may be embodied in various ways while inversely performing a process performed in the transform unit 210 and the quantization unit 215 of the above-described image encoding device 20. For example, inverse transform and the same process shared with a transform unit 210 and a quantization unit 215 may be used and a transform and dequantization process may be inversely performed with information on a transform and quantization process in an image encoding device 20 (e.g., a transform size, a transform shape, a quantization type, etc.)

A residual block after a dequantization and inverse transform process may be added to a prediction block derived by a prediction unit 310 to generate a reconstructed image block. Such addition may be performed by an adder-subtractor 325.

A filter 330 may apply a deblocking filter to a reconstructed image block to remove a blocking phenomenon, if necessary and additionally use other loop filters to improve image quality before and after the decoding process.

A constructed and filtered image block may be stored in a decoding picture buffer 335.

Although not shown in a drawing, a block partition unit may be additionally included in an image encoding/decoding device.

It may be partitioned into blocks with various units and sizes by a block partition unit. A base coding unit (or the maximum coding unit. Coding Tree Unit. CTU) may mean a base (or start) unit for prediction, transform, quantization, etc. in an image coding process. In this case, a base coding unit may be configured with one luma base coding block (or, the maximum coding block. Coding Tree Block. CTB) and two base chroma coding blocks according to a color format (in this example, YCbCr) and the size of each block may be determined according to a color format. And a coding block (CB) may be obtained according to a partition process. A coding block may be understood as a unit which is not partitioned into more coding blocks according to a fixed limit and may be set as a start unit for partition into a lower unit. In the present disclosure, a block may be understood as a wide concept which includes a variety of shapes such as a triangle, a circle, etc. without being limited to a square shape.

It should be understood that the after-mentioned contents are targeted for one color component, but may be changed and applied to other color component in proportion to a ratio according to a color format (e.g., for YCbCr 4:2:0, the aspect ratio of a luma component and a chroma component is 2:1). In addition, it should be understood that block partition dependent on other color component (e.g., in case of being dependent on a result from the block partition of Y in Cb/Cr) may be possible, but block partition independent of each color component may be possible. In addition, one common block partition setting (considering proportion to a length ratio) may be used, but it is needed to consider and understand that a separate block partition setting is used according to a color component.

In a block partition unit, a block may be described as M×N and the maximum value and minimum value of each block may be obtained in a range. For example, when the maximum value of a block is set to be 256×256 and the minimum value of a block is set to be 4×4, a $2^m \times 2^n$ sized block (in this example, m and n are an integer from 2 to 8), a $2^m \times 2^m$ sized block (in this example, m and n are an integer from 2 to 128) or a m×n sized block (in this example, m and n are an integer from 4 to 256) may be obtained. In this case, m and n may be identical or not identical and one or more ranges where a block for the maximum value, the minimum value, etc. is supported may be generated.

For example, information on the maximum size, the minimum size, etc. of a block may be generated and information on the maximum size, the minimum size, etc. of a block in some partition settings may be generated. In this case, the former may be range information on the maximum and minimum size which may be generated in an image and the latter may be information on the maximum and minimum size which may be generated according to some partition settings. In this case, the partition settings may be defined by an image type (I/P/B), a color component (YCbCr, etc.), a block type (coding/prediction/transform/quantization, etc.), a partition type (Index or Type), a partition method (QT, BT, TT, etc. in a Tree method, SI2, SI3, SI4, etc. in an Index method), etc.

In addition, there may be a limit on the aspect ratio (a shape of a block) that a block may have and a boundary value condition therefor may be set. In this case, only a block below/under an arbitrary boundary value (k) may be supported, and k may be defined according to an aspect ratio such as A/B (A is a value longer than or the same as width or height, B is the remaining value) and may be a real number over 1 such as 1.5, 2, 3, 4, etc. As in the above example, a limit condition on one block shape in an image may be supported or one or more limit conditions may be supported according to a partition setting.

In summary, whether block partition is supported may be determined by the above-mentioned range and condition, the after-mentioned partition setting, etc. For example, when a block condition that a candidate (a child block) according to the partition of a block (a parent block) is supported is satisfied, the corresponding partition may be supported and otherwise, the corresponding partition may not be supported.

A block partition unit may be set to be related to each construction unit for an image encoding device and decoding device, through which the size and shape of a block may be determined. In this case, a set block may be defined differently according to a construction unit and a prediction block for a prediction unit, a transform block for a transform unit, a quantization block for a quantization unit, etc. may correspond to it. But, a block unit according to other construction unit may be additionally defined without being limited thereto. The present disclosure mainly describes a case in which input and output are rectangular in each construction unit, but input/output in other shapes (e.g., a right-angled triangle, etc.) may be possible in some construction units.

The size and shape of an initial (or start) block in a block partition unit may be determined by a higher unit. The initial block may be partitioned into a smaller block and when the optimum size and shape according to the partition of a block are determined, that block may be determined as an initial block in a lower unit. In this case, a higher unit may be a coding block and a lower unit may be a prediction block or a transform block, but they are not limited thereto and may be variously modified. As in the above example, when an initial block in a lower unit is determined, a partition process for finding the optimum size and shape may be performed like a higher unit.

In summary, a block partition unit may partition a base coding block (or the maximum coding block) into at least one coding block and a coding block may be partitioned into at least one prediction block/transform block/quantization block. In addition, a prediction block may be partitioned into at least one transform block/quantization block and a transform block may be partitioned into at least one quantization block. In this case, some blocks may have a dependent (i.e., defined by a higher unit and a lower unit) or independent relationship with other block. In an example, a prediction block may be a higher unit for a transform block or an independent unit from a transform block and various relation settings may be possible according to a block type.

According to a coding setting, whether a higher unit and a lower unit are combined may be determined. In this case, combination between units means that a coding process in a lower unit (e.g., a prediction unit, a transform unit, an inverse transform unit, etc.) is performed by a block in a higher unit (size and shape) without partition from a higher unit to a lower unit. In other words, it may mean that a partition process in a plurality of units is shared and partition information is generated in one unit of them (e.g., a higher unit).

In an example, (when a coding block is combined with a prediction block and a transform block), a prediction, transform and inverse transform process may be performed in a coding block.

In an example, (when a coding block is combined with a prediction block), a prediction process may be performed in a coding block and a transform and inverse transform process may be performed in a transform block identical to or smaller than a coding block.

In an example, (when a coding block is combined with a transform block), a prediction process may be performed in a prediction block identical to or smaller than a coding block and a transform and inverse transform process may be performed in a coding block.

In an example, (when a prediction block is combined with a transform block), a prediction process may be performed in a prediction block identical to or smaller than a coding block and a transform and inverse transform process may be performed in a prediction block.

In an example, (when combination is not performed in any block), a prediction process may be performed in a prediction block identical to or smaller than a coding block and a transform and inverse transform process may be performed in a transform block identical to or smaller than a coding block.

The above example described a variety of cases on a coding, prediction and transform block, but it is not limited thereto.

For combination between the units, a fixed setting may be supported in an image or an adaptive setting may be supported by considering various coding elements. In this case, the coding elements may include an image type, a color component, a coding mode (Intra/Inter), a partition setting, a block size/shape/position, an aspect ratio, prediction-related information (e.g., an intra prediction mode, an inter prediction mode, etc.), transform-related information (e.g., transform method selection information, etc.), quantization-related information (e.g., quantization region selection information, quantized transformed coefficient coding information, etc.), etc.

As described above, when a block with the optimum size and shape is found, mode information therefor (e.g., partition information, etc.) may be generated. Mode information may be stored in a bitstream with information generated in a construction unit to which a block belongs (e.g., prediction-related information, transform-related information, etc.) and transmitted to a decoder and may be parsed in the same unit in a decoder and used in an image decoding process.

Hereinafter, a partition method will be described and for convenience of explanation, it is assumed that an initial block has a square shape, but as it may be equally or similarly applied even when an initial block has a rectangular shape, it is not limited thereto.

A block partition unit may support various kinds of partition. For example, it may support a tree-based partition or an index-based partition and other methods may be supported. A tree-based partition may determine a partition shape with various kinds of information (e.g., whether to partition, a tree type, a partition direction, etc.) and an index-based partition may determine a partition shape with predetermined index information.

FIG. 4 is an exemplary diagram showing various partition shapes which may be obtained in the block partition unit of the present disclosure.

In this example, it is assumed that a partition shape like FIG. 4 is obtained by performing one partition (or process), but it may be also obtained by a plurality of partition motions without being limited thereto. In addition, an additional partition shape not shown in FIG. 4 may be possible.

Tree-Based Partition

In the tree-based partition of the present disclosure, Quad Tree (QT), Binary Tree (BT), Ternary Tree (TT), etc. may be supported. When one tree method is supported, it may be referred to as a single tree partition and when more than two tree methods are supported, it may be referred to as a multiple tree partition.

QT means a method (n) in which a block is partitioned into two respectively (i.e., 4 divisions) in a horizontal and vertical direction, BT means a method (b to g) in which a block is partitioned into two in a horizontal or vertical direction and TT means a method (h to m) in which a block is partitioned into three in a horizontal or vertical direction.

In this case, QT may support a 4-divisoin method (o, p) by limiting a partition direction to one of a horizontal direction and a vertical direction. In addition, BT may support only a method (b, c) with a uniform size or only a method (d to g) with a non-uniform size or may mix and support two methods. In addition, TT may support only a method (h, j, k, m) with an arrangement that partition is skewed in a specific direction (1:1:2, 2:1:1, etc. from left to right or from top to bottom) or may support only a method (i, I) of being arranged in the center (1:2:1, etc.) or may mix and support two methods. In addition, it is also possible to support a method (q) in which a partition direction is partitioned into four respectively (i.e., 16 divisions) in a horizontal direction and a vertical direction.

And, among the tree methods, it is possible to support a z-partition method (b, d, e, h, i, j, o) only in a horizontal partition direction or support a z-partition method (c, f, g, k, I, m, p) only in a vertical direction or mix and support two methods. In this case, z may be an integer over 2 such as 2, 3 and 4.

In the present disclosure, it is described on the assumption that QT supports n, BT supports b and c and TT supports i and I.

According to a coding setting, one or more methods of the tree partitions may be supported. For example, QT may be supported, QT/BT may be supported or QT/BT/TT may be supported.

The above example is for a case in which base tree partition is QT and BT and TT are included in an additional partition method according to whether other trees are supported, but various modifications may be possible. In this case, information on whether other trees are supported (bt_enabled_flag, tt_enabled_flag, bt_tt_enabled_flag, etc. It may have a value of 0 or 1 and for 0, it is not supported and for 1, it is supported.) may be implicitly determined according to a coding setting or may be explicitly determined in a unit of a sequence, a picture, a slice, a tile group, a tile, a brick, etc.

Information on whether to partition (tree_part_flag or qt_part_flag, bt_part_flag, tt_part_flag, bt_tt_part_flag. It may have a value of 0 or 1 and for 0, it is not partitioned and for 1, it is partitioned.) may be included in partition information. In addition, according to a partition method (BT and TT), information on a partition direction (dir_part_flag or bt_dir_part_flag, tt_dir_part_flag, bt_tt_dir_part_flag. It may have a value of 0 or 1 and for 0, <width/horizontal> and for 1, <height/vertical>) may be added, which may be generated when partition is performed.

When a plurality of tree partitions is supported, partition information may be variously configured. Next, it will be described by assuming a case on how partition information is configured in one depth level (i.e., supported partition depth is set to be over 1, and a recursive partition may be possible, but it is for the convenience of explanation).

In an example (1), confirm information on whether to partition. In this case, when partition is not performed, partition is ended.

When partition is performed, confirm selection information on a partition type (e.g., tree_idx. For 0, QT, for 1, BT and for 2, TT). In this case, additionally confirm partition direction information according to a selected partition type and move on to the next step. (If additional partition is possible because partition depth does not reach the maximum, start again from the beginning, and when partition is impossible, partition is ended).

In an example (2), confirm information on whether some tree method (QT) performs partition and move on the next step. In this case, when partition is not performed, confirm information on whether some tree method (BT) performs partition. In this case, partition is not performed, confirm information on whether some tree method (TT) performs partition. In this case, when partition is not performed, partition is ended.

When some tree method (QT) performs partition, move on to the next step. In addition, when some tree method (BT) performs partition, confirm partition direction information and move on to the next step. In addition, when some tree partition method (TT) performs partition, confirm partition direction information and move on to the next step.

In an example (3), confirm information on some tree method (QT) performs partition. In this case, when partition is not performed, confirm information on whether some tree methods (BT and TT) perform partition. In this case, when partition is not performed, partition is ended.

When some tree method (QT) performs partition, move on to the next step. In addition, when some tree methods (BT and TT) perform partition, confirm partition direction information and move on to the next step.

The above example may be a case in which the priority of a tree partition exists (No. 2 and 3 example) or does not exist (No. 1 example), but it may be variously modified. In addition, a case in which partition in a current step is unrelated to a result of partition in a previous step is described in the above example, but partition in a current step may be also set to be dependent on a result of partition in a previous step.

For example, in case of No. 1 to 3 example, when the partition of some tree method (QT) is performed in a previous step to move on to a current step, the partition of the same tree method (QT) may be supported also in a current step.

On the other hand, when the partition of some tree method (QT) is not performed in a previous step and the partition of some tree methods (BT or TT) is performed to move on to a current step, the partition of some tree methods (BT and TT) excluding the partition of some tree method (QT) may be also set to be supported in a next step including a current step.

The above case means that tree configuration supported for block partition may be adaptive, which means the above-mentioned partition information configuration may be also configured differently. (It is assumed that an example described later is No. 3 example.) In other words, in the above example, when the partition of some tree method (QT) is not performed in a previous step, partition process may be performed in a current step without considering some tree method (QT). In addition, partition information on a related tree method (e.g., information on whether to partition, partition direction information, etc. In this example <QT>, information on whether to partition) may be removed and configured.

The above example is a case for adaptive partition information configuration on a case in which block partition is allowed (e.g., a block size is within a range between the maximum value and the minimum value, the partition depth of each tree method does not reach the maximum depth <allowable depth>, etc.) and adaptive partition information configuration may be possible even when block partition is limited (e.g., a block size is not within a range between the maximum value and the minimum value, the partition depth of each tree method reaches the maximum depth, etc.)

As mentioned above, a tree-based partition in the present disclosure may be performed with a recursive method. For example, when the partition flag of a coding block that partition depth is k is 0, the coding of a coding block is performed in a coding block that partition depth is k and when the partition flag of a coding block that partition depth is k is 1, the coding of a coding block is performed in N sub coding blocks that partition depth is k+1 according to a partition method (In this case, N is an integer over 2 such as 2, 3, 4).

The sub coding block may be set as a coding block (k+1) and partitioned into a sub coding block (k+2) in the above process and such a hierarchical partition method may be determined according to a partition setting such as a partition range, allowable partition depth, etc.

In this case, a bitstream structure for representing partition information may be selected among one or more scanning methods. For example, a bitstream for partition information may be configured based on the order of partition depth or a bitstream for partition information may be configured based on whether to partition.

For example, if it is based on the order of partition depth, it is a method of obtaining partition information in a next level depth after obtaining partition information in a current level depth based on a first block and if it is based on whether to partition, it means a method of preferentially obtaining additional partition information in a block partitioned based on a first block, and other additional scanning method may be considered.

The size of the maximum block or the minimum block may have a common setting regardless of a tree type (or all tress) or may have a separate setting according to each tree or may have a setting common to more than two trees. In this case, the size of the maximum block may be set to be identical to or smaller than the maximum coding block. If the size of the maximum block according to a predetermined first tree is not identical to the maximum coding block, partition is implicitly performed by using a predetermined second tree method until the maximum block size of the first tree is reached.

And, common partition depth may be supported regardless of a tree type or separate partition depth may be supported according to each tree or partition depth common to more than two trees may be supported. Alternatively, partition depth may be supported for some trees and partition depth may not be supported for some trees.

An explicit syntax element for the setting information may be supported and some setting information may be implicitly determined.

Index-Based Partition

In the index-based partition of the present disclosure, a CSI (Constant Split Index) method, a VSI (Variable Split Index) method, etc. may be supported.

A CSI method may be a method in which k sub-blocks are obtained by partition in a predetermined direction and k may be an integer over 2 such as 2, 3, 4. In detail, it may be a partition method for configuration in which the size and shape of a sub-block are determined based on the k value regardless of a block size and shape. In this case, for a predetermined direction, one or two or more directions among a horizontal direction, a vertical direction and a diagonal direction (left-top->right-bottom direction or left-bottom->right-top direction, etc.) may be combined.

The index-based CSI partition method of the present disclosure may include a candidate which is partitioned into z in one direction, horizontal or vertical. In this case, z may be an integer over 2 such as 2, 3, 4 and one of the width or height of each sub-block may be the same and the other may be the same or different. The aspect ratio of the sub-block may by A1: A2: . . . : AZ and A1 to AZ may be an integer over 1 such as 1, 2, 3.

In addition, a candidate which is partitioned into x and y, respectively, in a horizontal and vertical direction may be included. In this case, x and y may be an integer over 1 such as 1, 2, 3, 4, but when x and y are 1 at the same time (because a already exists), it may be limited. FIG. 4 showed a case in which a ratio of the width or height of each sub-block is the same, but a candidate including a different case may be included.

In addition, a candidate which is partitioned into w in one direction among some diagonal direction (left-top->right-bottom direction) or some diagonal direction (left-bottom->right-top direction) may be included and w may be an integer over 2 such as 2, 3.

In reference to FIG. 4, it may be classified into a symmetric partition shape (b) and an asymmetric partition shape (d, e) according to the length ratio of each sub-block and it may be classified into a partition shape (k, m) skewed in a specific direction and a partition shape (k) arranged in the center. A partition shape may be defined by a variety of coding elements including the shape of a sub-block, etc. as well as the length ratio of a sub-block and a supported partition shape may be implicitly or explicitly determined according to a coding setting. Accordingly, a candidate group in an index-based partition method may be determined based on a supported partition shape.

On the other hand, a VSI method may be a method in which more than one sub-blocks are obtained by partition in a predetermined direction as the width (w) or height (h) of a sub-block is fixed and w and h may be an integer over 1 such as 1, 2, 4, 8, etc. In detail, it may be a partition method for configuration in which the number of sub-blocks is determined based on the size and shape of a block and the w or n value.

The index-based VSI partition method of the present disclosure may include a partitioned candidate by fixing one of the width or height of a sub-block. Alternatively, it may include a partitioned candidate by fixing the width and height of a sub-block. As the width or height of a sub-block is fixed, uniform partition in a horizontal or vertical direction may be allowed, but it is not limited thereto.

When a block is M×N before partition and the width of a sub-block is fixed (w) or the height is fixed (h) or the width and height are fixed (w, h), the number of sub-blocks which are obtained may be (M*N)/w, (M*N)/h, (M*N)/w/h, respectively.

According to a coding setting, only CSI method may be supported, only VSI method may be supported or both two methods may be supported and information on a supported method may be implicitly or explicitly determined.

In the present disclosure, it is described on the assumption that a CSI method is supported.

According to a coding setting, a candidate group may be configured by including two or more candidates among the index partitions.

For example, a candidate group such as {a, b, c}, {a, b, c, n}, {a to g, n} may be configured, which may be a case that a block shape which is predicted to be considerably generated based on general statistical features such as a block shape which is partitioned into two (2) in a horizontal or vertical direction or partitioned into two (2) in a horizontal or vertical direction respectively is configured as a candidate group.

Alternatively, a candidate group such as {a, b}, {a, o}, {a, b, o} or {a, c}, {a, p}, {a, c, p} may be configured, which includes a candidate which is partitioned into two (2) and four (4) respectively in a horizontal and vertical direction. It may be a case in which a block shape which is predicted to be considerably partitioned in a specific direction is configured as a candidate group.

Alternatively, a candidate group such as {a, o, p} or {a, n, q} may be configured, which may be a case in which a block shape which is predicted to be considerably partitioned in a smaller size than a block before partition is configured as a candidate group.

Alternatively, a candidate group such as {a, r, s} may be configured, which may be a case in which a non-square partition shape is configured as a candidate group according to a judgment that the optimum partition result which may be obtained in a rectangular shape by other method (a tree method) in a block before partition was obtained.

As in the above example, various candidate group configurations may be possible and more than one candidate group configurations may be supported by considering a variety of coding elements.

When the candidate group configuration is completed, various partition information configurations may be possible.

For example, index selection information may be generated in a candidate group which is configured by including a non-partitioned candidate (a) and a partitioned candidate (b to s).

Alternatively, information showing whether to partition (whether a partition shape is a or not) may be generated and index selection information may be generated in a candidate group which is configured with a candidate (b to s) which is partitioned when partition is performed (if it is not a).

Various partition information configuration excluding the above description may be possible and except for information showing whether to partition, a binary bit may be assigned to the index of each candidate in a candidate group through various methods such as fixed length binarization, variable length binarization, etc. When the number of candidate groups is 2, a 1 bit may be assigned to index selection information and when the number of candidate groups is over 3, a 1 bit or more may be assigned to index selection information.

Contrary to a tree-based partition method, an index-based partition method may be a method of selectively configuring a partition shape which is predicted to be considerably generated in a candidate group.

And, as a bit amount for showing index information may increase according to the number of supported candidate groups, it may be a method suitable for a mono hierarchical partition (e.g. partition depth is limited to 0), not a tree-based hierarchical partition (recursive partition). In other words, it may be a method which supports one partition motion and which may not additionally partition a sub-block obtained by index-based partition.

In this case, it may mean that additional partition into a smaller block in the same type is impossible (e.g. a coding block obtained by an index partition method may not be additionally partitioned into a coding block), but additional partition into a block in a different type may be also set to be impossible (e.g. partition from a coding block not only into a coding block, but also into a prediction block is impossible). Of course, it is not limited to the above example and an example for other modification may be possible.

Next, a case in which a block partition setting is determined based on a block type among coding elements will be described.

First, a coding block may be obtained in a partition process. In this case, for a partition process, a tree-based partition method may be used and a result of a partition shape such as a (no split), n (QT), b, c (BT), i, I (TT), etc. in FIG. 4 may come out according to a tree type. According to a coding setting, each tree type may be variously combined such as QT/QT+BT/QT+BT+TT, etc.

The after-mentioned example shows a process in which a prediction block and a transform block are finally partitioned based on a coding block obtained in the process and assumes a case in which a prediction, transform and inverse transform process are performed based on each partitioned size.

In an example (1), a prediction process may be performed as a prediction block is set the same as the size of a coding block and a transform and inverse transform process may be performed as a transform block is set the same as the size of a coding block (or a prediction block). As a prediction block and a transform block are set based on a coding block, there is no partition information which is separately generated.

In an example (2), a prediction process may be performed as a prediction block is set the same as the size of a coding block. For a transform block, a transform block may be obtained in a partition process based on a coding block (or a prediction block) and a transform and inverse transform process may be performed based on an obtained size.

In this case, a tree-based partition method may be used for a partition process and a result of a partition shape such as a (no split), b, c (BT), i, I (TT), n (QT), etc. in FIG. 4 may come out according to a tree type. According to a coding setting, each tree type may be variously combined such as QT/BT/QT+BT/QT+BT+TT, etc.

In this case, an index-based partition method may be used for a partition process and a result of a partition shape such as a (no split), b, c, d, etc. in FIG. 4 may come out according to an index type. According to a coding setting, a variety of candidate group configurations such as {a, b, c}, {a, b, c, d}, etc. may be possible.

In an example (3), for a prediction block, a prediction block may be obtained in a partition process based on a coding block and a prediction process may be performed based on an obtained size. A transform block may be set the same as the size of a coding block to perform a transform and inverse transform process. This example may correspond to a case in which a prediction block and a transform block have a mutually independent relationship.

In this case, an index-based partition method may be used in a partition process and a result of a partition shape such as a (no split), b to g, n, r, s, etc. in FIG. 4 may come out according to an index type. According to a coding setting, a variety of candidate group configurations such as {a, b, c, n}, {a to g, n}, {a, r, s}, etc. may be possible.

In an example (4), for a prediction block, a prediction block may be obtained in a partition process based on a coding block and a prediction process may be performed based on an obtained size. A transform block may be set the same as the size of a prediction block to perform a transform and inverse transform process. This example may be a case in which a transform block is set the same as the size of an obtained prediction block or vice versa (e.g. a prediction block is set the same as the size of a transform block).

In this case, a tree-based partition method may be used in a partition process and a partition shape such as a (no split), b, c (BT), n (QT), etc. in FIG. 4 may be generated according to a tree type. According to a coding setting, each tree type may be variously combined such as QT/BT/QT+BT, etc.

In this case, an index-based partition method may be used in a partition process and a partition shape such as a (no split), b, c, n, o, p, etc. in FIG. 4 may be generated according to an index type. According to a coding setting, various candidate group configurations such as {a, b}, {a, c}, {a, n}, {a, o}, {a, p}, {a, b, c}, {a, o, p}, {a, b, c, n}, {a, b, c, n, p}, etc. may be possible. In addition, a candidate group may be configured by a VSI method alone or by mixing a VSI method with the CSI method among index-based partition methods.

In an example (5), for a prediction block, a prediction block may be obtained in a partition process based on a coding block and a prediction process may be performed based on an obtained size. In addition, for a transform block, a prediction block may be obtained in a partition process based on a coding block and a transform and inverse transform process may be performed based on an obtained size. This example may be a case in which a prediction block and a transform block are partitioned respectively based on a coding block.

In this case, a tree-based partition method and an index-based partition method may be used in a partition process and a candidate group may be configured the same as or similarly to No. 4 example.

While the above example describes some cases which may be generated according to whether a partition process for each type of a block is shared, etc., it is not limited thereto and an example for various modifications may be possible. In addition, a block partition setting may be determined by considering various coding elements as well as a block type.

In this case, a coding element may include an image type (I/P/B), a color component (YCbCr), a block size/shape/position, the aspect ratio of a block, a block type (a coding block, a prediction block, a transform block, a quantization block, etc.), a partition state, a coding mode (Intra/Inter), prediction-related information (an intra prediction mode, an inter prediction mode, etc.), transform-related information (transform method selection information, etc.), quantization-related information (quantization region selection information, quantized transformed coefficient coding information, etc.), etc.

FIG. 5 is an exemplary diagram showing a prediction mode in intra prediction according to an embodiment of the present disclosure.

In reference to FIG. 5, 95 prediction modes may be supported for intra prediction and among them, 93 prediction modes are a directional mode and 2 prediction modes are a non-directional mode (DC, Planar). In this case, a directional mode may be classified by a slope (e.g., dy/dx) or angle information Degree).

A non-directional mode may be a method performing prediction by a method such as average, interpolation, etc. of a reference pixel adjacent to a block and a directional mode may be a method performing prediction by a method such as the extrapolation, interpolation, etc. of a reference pixel adjacent to a block.

A directional mode may have a vertical (top->bottom/bottom->top), horizontal (left->right/right->left), diagonal A (left-top->right-bottom/right-bottom->left-top), diagonal B (right-top->left-bottom/left-bottom->right-top) direction, etc.

Generally, when coding is performed by a raster scan, etc., there may be a block adjacent to a left, top, left-top, right-top, left-bottom direction and a non-directional mode taking it as a reference pixel or a start point or for prediction or a prediction mode in a vertical (top->bottom), horizontal (left->right), diagonal A (left-top->right-bottom), diagonal B-1 (right-top->left-bottom), diagonal B-2 (left-bottom->right-top) direction may be supported. When other scan except for a raster scan is supported, a directional mode may be differently defined.

For example, when a left block is available and a right block is unavailable, a horizontal mode may perform prediction by extrapolation in a (right->left) direction. Alternatively, when both a left block and a right block are available, prediction may be performed by extrapolation in a predetermined direction (left->right or right->left) or prediction may be performed by the interpolation of both blocks. In the present disclosure, coding is performed according to the raster or z scanning order and it is described on the assumption that a reference pixel is positioned in a left, top, left-top, right-top, left-bottom direction.

In addition, a reconstructed block of other color space encoded by using correlation between color spaces may be used for the prediction of a target block and a prediction mode supporting it may be included. For example, for a chroma component, the prediction block of a target block may be generated by using the reconstructed block of a luma component corresponding to a target block. In other words, a prediction block may be generated based on a reconstructed block by considering correlation between color spaces and may be included as an intra prediction mode for a chroma component.

A chroma component may have the same candidate group as the prediction mode candidate group of a luma component or some modes among the prediction mode candidate groups of a luma component and an additional prediction mode on a chroma component (a color copy mode, a color mode) may be included in a prediction mode candidate group. In this case, for a color copy mode, it may be a prediction mode related to a method of obtaining data for generating a prediction block from a region positioned in other color space and for a color mode, it may be a prediction mode related to a method of obtaining a prediction mode from a region positioned in other color space. For a color copy mode and a color mode, m and n modes (m, n are an integer such as 0, 1, 2, 3 or more) may be supported, respectively.

When 1 color copy mode is supported, a method of obtaining predetermined data for generating a prediction block may be defined in advance and when two or more color copy modes are supported, a method of obtaining data for generating a prediction block may be classified (e.g., a position referenced to obtain correlation, etc. <1> left, <2> top, <3> left+top region, etc.) and supported.

When 1 color mode is supported, a predetermined position for obtaining a prediction mode may be defined in advance and when two or more color modes are supported, a plurality of positions (e.g., <1> center, <2> left-top, <3> right-top, <4> left-bottom, <5> right-bottom, etc. for a corresponding block) for obtaining a prediction mode may be supported.

All or part of prediction modes described in the above example may be included in the prediction mode candidate group of a luma component or a chroma component and other additional modes may be included in a prediction mode candidate group.

The prediction mode may mean all candidates for a supported intra prediction mode and a prediction mode candidate group may be configured with all or part of them. In this case, the prediction mode candidate group may be configured according to the size, shape (aspect ratio), etc. of a block.

For example, the number of prediction mode candidate groups may be determined according to a block size. In this case, a block size may be classified into one of more than two ranges divided based on one or more predetermined threshold sizes (A×B, C×D, etc.) and may be determined as one of 11, 35, 67, etc. and a plurality of numbers of candidate groups according to the classified range or whether a color copy mode, a color mode, etc. are supported and the number may be determined. In this case, the threshold size may be shown as width (W), height (H), W×H, etc. and W and H may be an integer over 2 such as 4, 8, 16, 32, 64, etc.

Alternatively, according to the shape of a block (or the aspect ratio of a block), the configuration of a prediction mode candidate group may be determined. In this case, the aspect ratio of a block may be classified as one of two or more ranges divided based on one or more predetermined threshold values and according to the classified range, the configuration of a candidate group may be determined. In this case, the threshold value may be shown as W/H (or H/W), etc. and may have an integer value over 1 such as 1, 2, 4, 8, 16, etc. or a decimal value between 0 and 1 such as 1, ½, ¼, ⅛, 1/16, etc.

The intra prediction of the present disclosure assumes a case in which 95 prediction modes as in FIG. 5 may be supported for a directional and non-directional mode and a color mode and a color copy mode may be supported. In addition, it is assumed that for the prediction mode candidate group of a luma component, 67 directional modes and non-directional modes are supported and for the prediction mode candidate group of a chroma component, a total of 8, 4 directional and non-directional modes, 1 color mode and 3 color copy modes, are supported, but it is not limited thereto. A predetermined standard for configuration may be present to select a mode included in a prediction mode candidate group except for the assumption.

The following shows an example for the configuration of a prediction mode candidate group according to the aspect ratio of a block.

TABLE 1

| ratio | pred mode (inc) | pred mode (exc) |
|---|---|---|
| 16 | 67~80 | 2~15 |
| 8 | 67~78 | 2~13 |
| 4 | 67~76 | 2~11 |
| 2 | 67~72 | 2~7 |

TABLE 1-continued

| ratio | pred mode (inc) | pred mode (exc) |
|---|---|---|
| 1 | — | — |
| 1/2 | −6~−1 | 61~66 |
| 1/4 | −10~−1 | 57~66 |
| 1/8 | −12~−1 | 55~66 |
| 1/16 | −14~−1 | 53~66 |

The table is set based on a case in which a prediction mode of No. 0 and 1 and a prediction mode of No. 2 to 66 are included in a prediction mode candidate group when it has a square block shape. With a prediction mode added to or excluded from the prediction mode candidate group (excluding a non-directional mode) of a square block when it has a rectangular block shape, a candidate configuration shown in the table may be possible, which may be an example set on the assumption that it is favorable in terms of prediction accuracy to configure a prediction mode more widely in the longer block than the shorter one, but it may be possible vice versa.

A reference pixel used for intra prediction may be configured in a reference pixel construction unit. In this case, a reference pixel may be managed in a temporary memory (e.g., Array. A first, second array, etc.) and may be generated and removed in every intra prediction process, and the size of a temporary memory may be determined according to the configuration of a reference pixel.

It is described on the assumption that a left, top, left-top, right-top and left-bottom block are used for intra prediction based on a target block, but it is not limited thereto and the block candidate group of other configuration may be used for intra prediction.

For example, the candidate group of a neighboring block for the reference pixel may be an example of a case in which a raster or Z scan is followed and according to the supported scanning order, some of the candidate groups may be removed or configured by including other block candidate group (e.g., additional configuration with a right, bottom, right-bottom block, etc.)

On the other hand, a pixel adjacent to a target block may be classified into at least one reference pixel layer and it may be classified into ref_0, the most adjacent pixel to a target block {pixels that pixel value difference with the boundary pixel of a target block is 1. p(−1,−1)~p(2m−1,−1), p(−1,0)~p(−1,2n−1)}, ref_1, the next adjacent pixel {pixel value difference with the boundary pixel of a target block is 2. p(−2,−2)~p(2m,−2), p(−2,−1)~p(−2,2n)}, ref_2, the next adjacent pixel {pixel value difference with the boundary pixel of a target block is 3. p(−3,−3)~p(2m+1, −3), p(−3,−2)~p(−3,2n+1)}, etc. In other words, a reference pixel may be classified into a plurality of reference pixel layers according to a pixel distance adjacent to the boundary pixel of a target block.

Reference pixel lines supported herein may be over N and N may be an integer such as 1, 2, 3, 4, or more. In this case, they are generally included in a reference pixel line candidate group sequentially from the most adjacent reference pixel line to a target block, but it is not limited thereto. For example, if N is 3, the candidate group may be sequentially configured like <ref_0, ref_1, ref_2>or the candidate group may be also configured by excluding a reference pixel line which is not sequential like <ref_0, ref_1, ref_3>, <ref_0, ref_2, ref_3>, <ref_1, ref_2, ref_3> or is most adjacent.

Prediction may be performed by using all reference pixel lines in the candidate group or by using some reference pixel lines (more than one).

For example, according to a coding setting, one of a plurality of reference pixel lines may be selected to perform intra prediction by using the corresponding reference pixel line. Alternatively, two or more of a plurality of reference pixel lines may be selected to perform intra prediction by using the corresponding reference pixel line (e.g., applying a weighted average, etc. to each reference pixel line data)

In this case, the selection of a reference pixel line may be implicitly or explicitly determined. For example, for an implicit case, it means that it is determined according to a coding setting defined by more than one or two combinations among elements such as an image type, a color component, a block size/shape/position, etc. In addition, for an explicit case, it means that information on the selection of a reference pixel line may be generated in a unit of a block, etc.

The present disclosure mainly describes a case in which intra prediction is performed by using the most adjacent reference pixel line. But, a reference pixel line referenced for prediction may be considered as one of the main coding elements in the present disclosure. In other words, an intra prediction setting may be determined regardless of a selected reference pixel line, but an intra prediction setting therefor may be determined.

The reference pixel construction unit of intra prediction in the present disclosure may include a reference pixel generation unit, a reference pixel interpolation unit, a reference pixel filter unit, etc. and may be configured by including all or part of the configurations.

In a reference pixel construction unit, an available reference pixel and an unavailable reference pixel may be classified by confirming availability for a reference pixel. In this case, a reference pixel is judged to be unavailable when at least one of the following conditions is satisfied.

For example, it may be judged to be unavailable when at least one of a case in which it is positioned outside a picture boundary, a case in which it does not belong to the same partition unit as a target block (e.g., a unit which may not be referenced each other such as a slice, a tile, etc. But, when even a unit such as a slice or a tile, etc. may be referenced each other, they are excluded although they are not the same partition unit) and a case in which coding is not completed is satisfied. In other words, it may be judged to be available when any of the conditions are not satisfied.

In addition, the use of a reference pixel may be limited by a coding setting. For example, although it is judged to be available under the conditions, the use of a reference pixel may be limited according to whether limited intra prediction (e.g., constrained_intra_pred_flag) is performed. Limited intra prediction may be performed to prohibit a reconstructed block which is referenced from other image to prevent error propagation caused by external factors including the communication environment, etc. from being used as a reference pixel.

When limited intra prediction is deactivated (e.g., for I image type. Or P or B image type, constrained_intra_pred_flag=0), all reference pixel candidate blocks may be available.

Alternatively, when limited intra prediction is activated (e.g., for a P or B image type, constrained_intra_pred_flag=1), it is assumed under the condition of judging whether a reference pixel candidate block is used according to a coding mode (Mode_Intra, Mode_InterD, Mode_InterC), but the conditions may be determined according to various other coding elements.

In this case, Mode_Intra, Mode_Inter_D, Mode_Inter_C may mean intra prediction, inter prediction which is referenced in other picture (block matching, etc.) and inter prediction which is referenced in a current picture respectively, and the setting in which in case of the Mode_Intra, reference is possible, and in case of the Mode_Inter, reference is not possible, may be general, but is not limited thereto.

As a reference pixel is composed of more than one blocks, it may be classified into three cases such as <all available>, <some available> and <all unavailable> after checking the possibility of the reference pixel. In other cases except for a <all available> case, a reference pixel at a position of an unavailable candidate block may be filled or generated.

When a reference pixel candidate block is available, a pixel at the corresponding position may be included in the reference pixel memory of a target block. In this case, the pixel data may be copied as it is or may be included in a reference pixel memory in a process such as a reference pixel filtering, a reference pixel interpolation, etc. In addition, when a reference pixel candidate block is unavailable, a pixel obtained in a process of generating a reference pixel may be included in the reference pixel memory of a target block.

The following shows an example in which a reference pixel at a position of an unavailable block is generated by using various methods.

For example, a reference pixel may be generated by using an arbitrary pixel value. In this case, an arbitrary pixel value may be one pixel value (e.g., the minimum value, the maximum value, the central value, etc. in a range of a pixel value) which belongs to a range of a pixel value (e.g., a range of a pixel value based on bit depth or according to pixel distribution in a corresponding image). In detail, it may be an example which is applied when all reference pixel candidate blocks are unavailable.

Alternatively, a reference pixel may be generated from a region where an image is encoded. In detail, a reference pixel may be generated from at least one available block adjacent to an unavailable block. In this case, at least one of methods such as extrapolation, interpolation, copy, etc. may be used.

For the above example, a reference pixel may target a region which is adjacent centering around a target block and may be considered by including a region (a region obtaining prediction data or a region adjacent thereto) corresponding to a target block in other color space which is referenced in some prediction modes (e.g., a color copy mode, etc.).

After the reference pixel configuration is completed, a reference pixel filtering or a reference pixel interpolation may be performed. For example, only a reference pixel filtering may be performed, only a reference pixel interpolation may be performed or both a reference pixel filtering and a reference pixel interpolation may be performed. A reference pixel filtering may be performed before or after a reference pixel interpolation and may be also performed by being combined with a reference pixel interpolation at the same time.

A reference pixel filtering may be a process which is performed to reduce remaining degradation in a reference pixel. A reference pixel filtering may be one of a plurality of filters which may be classified by setting the length and coefficient of various filter taps such as [1, 2, 1]/4, [2, 3, 6, 3, 2]/16, etc. In addition, a plurality of filtering may be performed by varying a filter type.

Whether a reference pixel filtering is performed may be explicitly determined or whether a reference pixel filtering is performed may be implicitly determined according to a coding setting. In this case, a coding setting may be defined based on the state information (a block size, shape, position, etc.) of a target block, an image type (I/P/B), a color component (Y/Cb/Cr), reference pixel line selection information, whether intra prediction in a sub-block unit is applied, an intra prediction mode, etc.

Reference pixel interpolation may not be performed in a prediction mode which refers to only a pixel in an integer unit and reference pixel interpolation may be performed in a prediction mode which refers to a pixel in a decimal unit.

The position of a pixel (i.e., which decimal unit is interpolated) where interpolation is performed may be determined according to a prediction mode (e.g., direction for a prediction mode. dy/dx, etc.) and the position of a reference pixel and a prediction pixel. In this case, one filter may be applied regardless of the accuracy of a decimal unit or one of a plurality of filters (e.g., assuming a filter that an equation used to determine a filter coefficient or the length of a filter tap is divided) may be applied by being selected in a decimal unit.

The former may be an example in which a pixel in an integer unit is used as input for the interpolation of a pixel in a decimal unit and the latter may be an example in which an input pixel varies per step (e.g., for a ½ unit, using an integer pixel. For a ¼ unit, using an integer and a ½ unit pixel, etc.), but it is not limited thereto and it is described based on the former in the present disclosure.

A fixed filtering or an adaptive filtering may be performed for reference pixel interpolation, which may be determined according to a coding setting. In this case, the coding setting may be defined based on the state information of a target block, an image type, a color component, reference pixel line selection information, whether intra prediction in a sub-block unit is applied, an intra prediction mode, etc.

A fixed filtering may perform reference pixel interpolation by using one filter and an adaptive filtering may perform reference pixel interpolation by using one of a plurality of filters.

In this case, for an adaptive filtering, one of a plurality of filters may be implicitly or explicitly determined according to a coding setting. In this case, a filter type may be configured after more than one is selected from a 4-tap DCT-IF filter, a 4-tap cubic filter, a 4-tap Gaussian filter, a 6-tap wiener filter, a 8-tap Kalman filter, etc. and a supported filter candidate group may be also differently defined according to a color component (e.g., some filter types are the same or different, and the length of a filter tap is short or long, etc.)

A prediction block may be generated according to at least one prediction mode in a prediction block generation unit and a reference pixel may be used based on the prediction mode. In this case, a reference pixel may be used for a method such as extrapolation, etc. according to a prediction mode and may be used for a method such as interpolation, DC, or copy, etc.

A process for selecting the optimum mode among a plurality of prediction mode candidate groups is performed in a prediction mode determination unit. Generally, the optimum mode in terms of an encoding expense may be determined by using block distortion {e.g., Distortion of a target block and a reconstructed block. Distortion. SAD (Sum of Absolute Difference), SSD (Sum of Square Difference), etc.} and rate-distortion that the amount of generated bits according to a corresponding mode is considered. A prediction block generated based on a prediction mode determined in the process may be transmitted to a subtraction unit and an add unit.

A prediction mode selected in a prediction mode determination unit may be encoded in a prediction mode encoding unit. In a prediction mode candidate group, index information corresponding to the prediction mode may be encoded or the prediction mode may be predicted to encode information on it. The former may be a method applied to a luma component and the latter may be a method applied to a chroma component, but it is not limited thereto.

When a prediction mode is predicted and encoded, it may be classified into a plurality of categories (K. K is an integer such as 2, 3, 4, or more) and managed. For example, when it is classified into 2 categories, one category may consist of a prediction mode which is predicted to be identical to the prediction mode of a target block and the other category may consist of a prediction which is predicted to be unlikely to be identical to a prediction mode. In other words, other category may consist of a prediction mode which was not selected as a mode which is predicted to be identical to the prediction mode of a target block.

The above example is a case in which a prediction mode is classified into 2 categories and may be classified into more categories. When it is classified into 3 categories, a first category may consist of a prediction mode which is predicted to be highly likely to be identical to the prediction mode of a target block, a second category may consist of a prediction mode which is predicted to be likely to be identical to the prediction mode of a target block and a third category may consist of a prediction mode which is predicted to be unlikely to be identical to the prediction mode of a target block. In other words, the second category may consist of a prediction mode which is predicted to be identical to the prediction mode of a target block among prediction modes which do not belong to the first category and the third category may consist of a prediction mode which does not belong to the first and second category.

For other example for classifying categories, they may be classified according to a prediction method. For example, they may be classified by a prediction method according to extrapolation, a prediction method according to interpolation/average, a prediction method according to copy, etc. In this case, a prediction method according to extrapolation may mean a directional mode, a prediction method according to interpolation/average may mean a non-directional mode, a prediction method according to copy may be classified into a color copy mode and other various classifications may be possible. As a color mode derives a prediction mode in other color space, it may be distinguished from the directional or non-directional mode, but for convenience of explanation, it is assumed that it is classified into a directional/non-directional mode.

When being classified into 2 categories according to a prediction method, the first category may consist of a directional/non-directional mode and the second category may consist of a color copy mode. Alternatively, the first category may consist of a directional mode and the second category may consist of a non-directional mode. The former may be applied to the intra prediction of a chroma component and the latter may be applied to the intra prediction of a luma component. In the after-described part, it is assumed that when a color copy mode is included, it may be applied to the intra prediction mode of a chroma component, but it should be understood that even when a color copy mode is not included, it is not applied only to the intra prediction mode of a luma component.

When being classified into 3 categories, the first category may consist of a directional mode, the second category may consist of a non-directional mode and the third category may consist of a color copy mode. Alternatively, the first category may consist of a predetermined mode (e.g., a vertical, horizontal, diagonal A mode, etc.) among directional modes, the second category may consist of a predetermined mode (e.g., a diagonal B mode, etc.) among directional modes and the third category may consist of a color copy mode. In this case, a diagonal A mode may consist of a diagonal mode using only an integer pixel in prediction and a diagonal B mode may consist of a diagonal mode using an integer pixel and a decimal pixel in prediction, but it is not limited thereto.

The above description is an example for the configuration of a category and it may be classified according to various predetermined standards without being limited thereto. In addition, a plurality of predetermined standards may be combined and applied to the configuration of a category.

When a prediction mode is classified into a plurality of categories, selection information on in which category the prediction mode of a target block is generated and candidate selection information in each category may be generated. When a candidate in a category is 1, candidate selection information may be omitted. It may be possible to configure various syntax elements on the category selection and candidate selection in the category. Next, a case in which 3 categories are supported is assumed.

* One syntax element on category selection is supported.

The value of a syntax element supported for category selection in this example may have a value of 0 to 2 (a value over 1). In an example, for the first to third category, binarization to which a <0>, <10>, <11> bit is assigned may be possible. In other words, one syntax element for category selection may be supported and may be configured in a type that index assignment and binarization for each category are applied.

* A plurality of syntax elements on category selection are supported.

The value of a syntax element supported for category selection in this example may have a value of 0 or 1 (also a value over 1).

In an example, for one syntax element (a first syntax element), <0> may be assigned to the first category and the second category and <1> may be assigned to the third category. In this case, when the syntax element has a value of <0>, another syntax element (a second syntax element) on subcategory selection which selects one of the first category and the second category may be supported and for the corresponding syntax element, <0>, <1> may be assigned to the first category and the second category.

In an example, for one syntax element (a first syntax element), <0>may be assigned to the first category and <1> may be assigned to the second category and the third category. In this case, when the syntax element has a value of <1>, another syntax element (a second syntax element) on subcategory selection which selects one of the second category and the third category may be supported and for the corresponding syntax element, <0>, <1> may be assigned to the second category and the third category.

The above example is an example on syntax element configuration for category selection and various modifications and configurations may be possible.

The above each category may include at least one prediction mode. The number of prediction modes in the first to third category may be a, b, c, and a may be less than or equal to b and c and b may be less than or equal to c. In this example, it is assumed that a is an integer between 1~5, b is an integer between 3~8 and c is the number subtracting the number of a and b from the number of prediction mode candidate groups. Variable length binarization or fixed length binarization such as Truncated Rice binarization, Truncated Binary binarization, k-th Exp-Golomb binarization, etc. may be applied to a prediction mode which belongs to the category.

In the after-mentioned example, it is described on the assumption that the configuration and setting of a category are fixed, but an adaptive setting may be possible according to various coding elements (e.g., the number of categories, the configuration of related flags, etc.). In this case, the coding elements may be defined based on a color component (luma/chroma), the state information of a block (e.g., a block size, shape, aspect ratio, position, etc.), an image type (I/P/B), whether intra prediction in a sub-block unit is applied, reference pixel line selection information, etc. In an example, based on the coding information, the number of categories may be determined to be one of 2 or 3.

Next, an example will be described in which a prediction mode is classified into a plurality of categories (3) based on the probability of matching a prediction mode and a prediction mode is encoded based on category selection information and candidate selection information in a category. But, an example in which standards for category classification according to a prediction method are combined for category configuration may be possible. In addition, when the second category among the first category and the second category is excluded or explanation on the first category and the second category is integrated, explanation configured with 2 categories may be derived, so detailed explanation therefor is omitted.

FIG. 6 is an arrangement diagram on a target block and a block adjacent thereto according to an embodiment of the present disclosure.

A target block may have a high correlation with a block adjacent thereto, and may not only perform prediction by using an adjacent reference pixel, but also use the prediction mode of an adjacent block to predict the prediction mode of a target block. Accordingly, the prediction mode of a block adjacent to a target block may be selected as a candidate included in the first or second category. In this case, all or part of prediction modes of a left, top, left-top, right-top and left-bottom block for a target block may be considered as a candidate included in a (previous) category. In an example, (left/top), (left/top/right-top), (left/top/left-bottom), (left/top/left-top/right-bottom/left-top), etc. may be considered.

When the prediction mode of an adjacent block is considered as a candidate included in a category, at least one prediction mode may be selected from a block in each direction. For example, for a left block, one may be selected in L0 to L3 and for a top block, one may be selected in U0 to U3.

A sub-block at a specific position (e.g., a left block is L3, a top block is U3) for selecting a prediction mode may be defined by considering a case in which an adjacent block in a predetermined direction (in this example, a left, top block) is partitioned into a plurality of sub-blocks. When a prediction mode for a block at the corresponding position is unavailable (e.g., when the corresponding block is not encoded, when it is at a position which may not be referenced, when a coding mode <Intra/Inter>is different, etc.), a prediction mode may not be selected in a block in the corresponding direction.

Alternatively, a priority for selecting a prediction mode (a sub-block) may be supported (e.g., L3->L0->L1->L2, etc.) and accordingly, the prediction mode of an available sub-block with a previous priority may be selected as a prediction mode in the corresponding direction. When the prediction mode of a sub-block at all positions is unavailable, a prediction mode may not be selected in a block in the corresponding direction.

And, a priority for including a prediction mode obtained from a block in each direction in a category may be supported. For example, settings such as left->top->right-top->left-bottom->left-top, left->top->left-bottom->right-top->left-top, top->left->left-bottom->right-top->left-top, etc. may be possible and it is not limited thereto.

A lot of prediction modes are included in a prediction mode candidate group, but there may be lots of prediction modes which are generally generated among them. For example, an edge in a vertical and horizontal direction may be a common image characteristic and a lot of flat regions like a background may be found. Accordingly, a predetermined prediction mode which is predicted to be considerably generated may be selected as a candidate included in the first or second category.

A non-directional prediction mode Planar (No. 0), DC mode (No. 1) and a horizontal (No. 18), vertical (No. 50) and diagonal mode (No. 2, No. 34, No. 66, etc.) may be a target for a candidate of a preset prediction mode which is predicted to be considerably generated. A priority for including the prediction mode in a category may be supported. For example, settings such as Planar->DC->Ver->Hor, etc. are possible and it is not limited thereto.

When all or part of prediction modes of an adjacent block are unavailable, it may be replaced and filled with more than one of the preset prediction modes (e.g., Planar, DC, etc.)

In the above description, the prediction mode of an adjacent block of a target block and a preset prediction mode are referred to as a prediction mode which is considered for category configuration. But, when there are a lot of prediction mode candidate groups, it may be hard to effectively predict the prediction mode of a target block with the above configuration. In an example, when difference is generated by 1, 2 in a directional mode (based on a prediction mode in FIG. 5), prediction may fail with the above configuration.

For it, a prediction mode derived based on the prediction mode of an adjacent block and a preset prediction mode may be considered for configuring a category candidate group. In an example, a k-spaced prediction mode based on the prediction mode (in this example, a directional mode) may be considered as a derived prediction mode and it may be selected as a candidate included in the first or second category. In this case, k may be an integer such as 1, 2, 3, 4, or more.

In this case, when it is assumed that a prediction mode based on the prediction mode of an adjacent block or a preset prediction mode is Z, there may be a priority for a derived prediction mode such as Z−1, Z+1, Z−2. In this example, it is assumed that a priority is determined in the order of an absolute value such as 1, 2 and (one absolute value) <−> code is followed by <+> code, but it is not limited thereto. In other words, it means that distance information for filling the derived prediction mode may not start from 1 (e.g., an integer such as 4, 8, 12, etc.) And, a k distance of a prediction mode derived based on the prediction mode of an adjacent block and a preset prediction mode may be identical or not identical.

In addition, when it is assumed that a prediction mode based on the prediction mode of an adjacent block or a preset prediction mode is X, Y, there may be a priority for a derived prediction mode such as X−1, X+1, Y−1, Y+1 or X−1, Y−1, X+1, Y+1. In this example, it is assumed that X has priority over Y, and a <−> code and a <+> code alternate with each other or the other code (a positive number in this example) is derived after one code (a negative number in this example) is entirely derived (based on one absolute value), but it is not limited thereto.

In addition, a plurality of modes (X, Y in this example) may be used as a base mode for a derived mode or a predetermined mode of them (i.e., one of X, Y) may be used as a base mode. It may be classified according to a predetermined standard and may be determined based on the position of an obtained block (e.g., a mode of any specific block between a left block and a top block is set as a base mode), the shape of a target block (e.g., a mode of a top block between a left block and a top block in case of a horizontally long rectangular shape and a mode of a left block in case of a vertically long rectangular shape is set as a base mode. Or, vice versa, etc.) and the slope information of a prediction mode (e.g., a mode more inclined in a specific direction <left or right, top or bottom>based on a vertical or horizontal mode is set as a base mode).

In summary, a prediction mode derived based on a preset prediction mode, the prediction mode of an adjacent block and a precedent prediction mode may be included in a (precedent) category.

Each category may include at least one prediction mode of a preset prediction mode, the prediction mode of an adjacent block and a derived prediction mode and is referred to as Group_A, Group_B and Group_C, respectively, for convenience of explanation.

For example, Group_A may be configured in a first category, Group_A, Group_B and Group_C may be configured in a second category and other modes (it may be Group_C in this case) may be configured in a third category.

Alternatively, Group_B may be configured in a first category, Group_A, Group_B and Group_C may be configured in a second category and other modes may be configured in a third category.

Alternatively, Group_A and Group_B may be configured in a first category, Group_A, Group_B and Group_C may be configured in a second category and other modes may be configured in a third category.

The above example is an example on mode configuration according to category classification and for Group_A and Group_B included in a plurality of categories, it may be understood that other modes not configured in a precedent category are configured in a subsequent category. In addition, mode configuration by variously classifying categories may be possible without limitation to the above example.

Next, it is assumed that the priority of a prediction mode for category configuration is supported and when a mode is configured as many as unsubordinated categories (e.g., the first category) according to the priority of a category (e.g., 1-2-3 category order), remaining modes are configured in a subordinated category (e.g., the second category, the third category, etc.).

In the after-mentioned example, it is assumed that a priority such as Planar (assuming that No. 0 index is assigned)->L->A->DC-><L−1>-><L+1>-><A−−1>-><A+1>-><L−2>-><L+2>-><A−2>-><A+2>->Ver->Hor-><Ver−4>-><Ver+4>-><Hor-4>-><Hor+4>, etc. is supported.

For example, when the number of a prediction mode in the first category is 1, a prediction mode belonging to Group_A may be Planar (No. 0 index) and as the number of prediction modes increases, Group_A may be configured with subordinated prediction modes.

In addition, when the number of a prediction mode in the second category is 1, a prediction mode belonging to Group_B may be from the next prediction mode (No. m+1 index) of a prediction mode finally configured in the first category (No. m index) and as the number of prediction modes increases, Group_B may be configured with subordinated prediction modes.

In addition, for the third category, Group_C may be configured with remaining prediction modes from the next prediction mode (No. n+1 index) of a prediction mode (No. n index) finally configured in the second category.

The number of prediction modes in the first to third category (in this example, when prediction mode candidate groups are 67) may be variously set such as (1, 5, 61), (2, 4, 61), (4, 8, 55), etc. and may be determined based on the number of prediction mode candidate groups.

In the above example, a preset prediction mode may be a mode which is fixedly supported regardless of a coding environment and a derived prediction mode may be obtained by taking a prediction mode which already exists in a candidate group as a base mode.

On the other hand, a case may occur that it is difficult to obtain the prediction mode of an adjacent block according to the state of an adjacent block (e.g., a boundary of a partition unit, whether it is encoded or not, a coding mode, etc.) In this case, the state of an adjacent block may be classified into (1) a case in which all adjacent blocks are unavailable, (2) a case in which some of adjacent blocks are unavailable and (3) a case in which all adjacent blocks are available and an example in the priority may be described by assuming a case in which all adjacent blocks are available.

In addition, the prediction mode of an adjacent block may be obtained from two or more blocks and an example in the priority may be described by assuming a case in which the prediction mode of each block is not overlapped.

In addition, an example in the priority may be described by assuming a case in which the prediction mode of an adjacent block is not overlapped with a preset prediction mode.

A priority for category configuration may be adaptively set by considering the above elements. For example, an index corresponding to the prediction mode of an adjacent block may be removed from the priority and an index on a mode derived by taking the prediction mode of an adjacent block as a base mode may be also removed. It may be commonly applied both to a case in which the prediction mode of an adjacent block is a directional mode and a case in which the prediction mode of an adjacent block is a non-directional mode.

In addition, when the prediction mode of an adjacent block is overlapped, an index corresponding to other overlapped prediction mode and an index on a derived mode may be removed. Alternatively, a plurality of priorities considering the elements may be supported and a category may be configured, accordingly.

In the intra prediction of the present disclosure, it is described that some of supported prediction modes may be configured as a prediction mode candidate group. It may mean that each separate prediction mode (e.g., a directional mode) may be supported according to the state information of a target block (e.g., a block size, shape, etc.)

For prediction mode coding, unifying it into a common prediction mode candidate group configuration may be preceded over coding. For example, it may be unified into a prediction mode candidate group configuration in a predetermined range for prediction mode coding and based on it, prediction mode coding may be performed. In this case, the predetermined range may be configured with a prediction mode corresponding to No. 0 to No. 66 in FIG. 5, but it is not limited thereto.

In unification, mapping in the predetermined range may be performed and it may be performed based on the direction of a prediction mode. In an example, for a prediction mode outside the predetermined range, mapping (e.g., in case that an edge direction is the same, etc. In other words, a case is included in which a start point for prediction and a prediction direction are different, but an edge direction is the same) may be performed by a prediction mode with a characteristic similar to the corresponding prediction mode and other various methods may be supported.

Prediction-related information generated in the process may be transmitted to an encoding unit and stored in a bitstream.

In the above explanation, a unit that intra prediction is performed is referred to as a target block. In this case, the target block may be set as a variety of block units according to a block setting.

In an example, when a coding block is the same unit as a prediction block and a transform block (i.e., when a coding block is immediately set as a prediction block or a transform block), the target block of intra prediction for reference pixel region setting, reference pixel configuration (reference pixel filtering/reference pixel interpolation), prediction mode candidate group configuration, prediction performance, prediction mode coding, etc. may be selected as a coding block.

In an example, when a coding block is a unit which may be the same or not the same as a prediction block and a transform block (i.e., a coding block may be partitioned into two or more sub-blocks <prediction blocks or transform blocks>), the target block of intra prediction may be set as one of a coding block, a prediction block and a transform block.

For example, a coding block may be set as a target block for (prediction mode coding, prediction mode candidate group configuration/reference pixel configuration), etc. and a prediction block or a transform block may be set as a target block for (reference pixel region setting/prediction performance), etc.

Alternatively, a coding block may be set as a target block for (prediction mode coding/prediction mode candidate group configuration), etc. and a prediction block or a transform block may be set as a target block for (reference pixel region setting/reference pixel configuration/prediction performance), etc.

In summary, a target block may be set as one of a coding block, a prediction block and a transform block and the target block unit of detailed configuration may be determined according to a coding setting.

In an image decoding method according to an embodiment of the present disclosure, intra prediction may be configured as follows. Intra prediction in a prediction unit may include decoding a prediction mode, configuring a reference pixel and generating a prediction block. In addition, an image decoding device may be configured to include a prediction mode decoding unit, a reference pixel construction unit and a prediction block generation unit which embody prediction mode decoding, reference pixel configuration and prediction block generation. A part of the above-mentioned processes may be omitted or other process may be added, and it may be changed in other order, not in order entered above.

As the reference pixel construction unit and prediction block generation unit of an image decoding device play the same role as configuration corresponding to an image encoding device, detailed description is omitted and a prediction mode decoding unit may be performed by inversely using a method used in a prediction mode encoding unit.

FIG. 7 is a flow chart showing the modification method of intra prediction according to an embodiment of the present disclosure.

In reference to FIG. 7, the intra prediction mode of a target block may be determined (S700) and a prediction block may be generated (S710) based on an intra prediction mode. The modification setting of a prediction block may be determined (S720) and the modification of a prediction block may be performed (S730).

The intra prediction of a target block may be selected in a prediction mode candidate group obtained based on the state information of a target block and one prediction mode of them may be determined.

A luma component may refer to a prediction mode candidate group configured with a directional mode and a non-directional mode and a chroma component may refer to a prediction mode candidate group that a color mode or a color copy mode is supported for a directional mode and a non-directional mode.

In this case, it may be classified into a directional mode/a non-directional mode/a color copy mode according to a prediction method and each method may use extrapolation, interpolation or average, copy, but it is not limited thereto and other modifications may be possible. In an example, according to a reference pixel region setting, interpolation (bidirectional prediction) as well as extrapolation may be supported in a directional mode.

In summary, according to each prediction method, a reference region for intra prediction may be set differently and for extrapolation, at least one of a block in the left, top, left-top, right-top and left-bottom direction of a target block may be set as a reference region and for interpolation, at least one of a block in the right, bottom and right-bottom direction of a target block may be set as a reference region in addition to extrapolation. In this case, when an adjacent region is not encoded, it may be derived from one or more pixels in an encoded region and filled. In addition, for copy, a block corresponding to a target block in other color space may be set as a reference region.

Based on data in the reference region and an intra prediction mode, a prediction mode may be generated.

Modifying a prediction block may be performed to reduce discontinuous boundary characteristics with an adjacent block in a prediction block generated according to a predetermined prediction mode. But, modification according to an image characteristic may cause a reverse effect, so it is needed to perform modification by considering various coding elements.

For whether to support modification for a prediction block, related information may be explicitly generated or implicitly determined. And, even if it is determined to support modification in a higher unit such as a sequence, a picture, etc., the modification setting of a target block may be defined based on an image type, a color component, the state information of a target block, a coding mode, an intra prediction mode, whether intra prediction in a sub-block unit is applied, reference pixel line selection information, etc. In addition, modification-related setting information (e.g., a flag on whether modification in a block unit is performed, weight information applied to modification, etc.) may be explicitly generated in a lower unit (e.g., for the former information, a block, a sub-block, etc.) or a higher unit (e.g., for the latter information, a sequence, a picture, a slice, a tile, etc.)

The modification setting may be configured by including whether modification is performed, the number, position, weight, etc. of a reference pixel used for modification, etc. Although modification is performed, modification may be performed for all or part of pixels in a target block. For example, when a target block is m×n, modification may be performed for 1 to (m×n) pixels.

In this case, whether modification (in a pixel unit) is applied, (when modification is performed) the number (1~5), position, weight, etc. of reference pixels used for modification, etc. may be set based on the position of a pixel in a block as well as the modification setting.

In this case, an intra prediction mode that modification is supported may be determined according to whether it belongs to a predetermined prediction mode group. For example, the prediction mode group may be configured among a Planar, DC, horizontal, vertical and diagonal mode (e.g., a right-top directional mode, a right-bottom directional mode, a left-bottom directional mode, etc. No. 2, 34, 66 mode in FIG. 5) and a color copy mode. Alternatively, it may be configured by additionally including a prediction mode derived from the prediction mode group (e.g., a k-spaced mode based on a directional mode. In this case, k is an integer that an absolute value is 1, 2, 3, 4 or more.)

A target block that modification is supported may be smaller than or the same as a predetermined first threshold size. In this case, the first threshold size may mean the maximum size that a target block may have.

In addition, a block that modification is supported may be larger than or the same as a predetermined second threshold size. In this case, the second threshold size may mean the minimum size that a target block may have.

In this case, the first threshold size and the second threshold size may be shown as width (W), height (H), W×H, W*H, etc. and W and H may be an integer such as 4, 8, 16, 32 or more. In this case, the first threshold size may be larger than or the same as the second threshold size.

FIG. 8 is an arrangement diagram on the pixel of a target block and an adjacent block according to an embodiment of the present disclosure.

In reference to FIG. 8, it is composed of a pixel (a~p) in a target block, a pixel (A~Q) in an adjacent block which is encoded and a pixel (aa~ii) in an adjacent block which is not encoded. In this case, modification may be performed for a pixel in a target block and a pixel in an adjacent block may be referenced for modification.

In this case, a reference pixel in an adjacent block may be one of values which are obtained after a reference pixel preprocessing process (e.g., a reference pixel filtering) is not performed or is performed. It may be determined in a block unit or a pixel unit.

The following represents an equation that a modified pixel is obtained after modification is applied to a prediction pixel.

$$Z=(z*w0)+(a*w1)+(b*w2)+(c*w3)$$

In this case, z and Z mean a prediction pixel and a modified pixel, respectively, a to c mean a reference pixel used for modification and w0 to w3 mean a weight applied to modification. According to the number of reference pixels used for modification, the reference pixel and weight may be determined. In this case, a value considering normalization by including 0 may be assigned to a weight.

According to the prediction mode of a target block, the position and number of the reference pixels may be determined.

For example, when the prediction mode of a target block is a Planar, DC, vertical, horizontal mode, the a, b, c may be set as a left-top reference pixel outside a target block (e.g., <−1,−1>), a reference pixel at the top of a target block responding or corresponding to a x component of a target pixel (e.g., <x, −1>) and a reference pixel at the left of a target block responding or corresponding to a y component of a target pixel (e.g., <−1, y>).

In this case, for a Planar, DC mode, a weight may be assigned to w2 and w3 to reflect a reference pixel gradient at the top and left of a target block. It may be an example (e.g., w1 is 0) on a weight setting based on how much it is changed from a reference pixel corresponding to a x and y component of a target pixel.

In this case, for a vertical mode, a weight with a negative code may be assigned to w0 and a weight with a positive code (i.e., an inverse code) may be assigned to w3 to reflect a reference pixel gradient corresponding to a prediction direction. It may be an example (e.g., w2 is 0) on a weight setting based on how much a reference pixel corresponding to a y component of a target pixel is changed from a left-top reference pixel. For a horizontal mode, related explanation may be derived in a vertical mode, so detailed explanation is omitted.

Alternatively, when the prediction mode of a target block is a diagonal mode, the a, b, c may be set as a left-top reference pixel outside a target block, a reference pixel (e.g., <x+y+1,−1>) responding or corresponding to a start point in the prediction direction of a target block and a reference pixel (e.g., <−1, x+y+1>) responding or corresponding to a side opposite to a start point in the prediction direction of a target block. In this case, when the reference pixel is not obtained in an integer unit (i.e., when interpolation is needed in a decimal unit), it may be set by one of a method which obtains it by being replaced with one adjacent reference pixel or a method which obtains it by being interpolated through a reference pixel adjacent to both sides.

In this case, for a diagonal mode in a right-top direction, a weight may be assigned to w3 to reflect the gradient of a reference pixel positioned at a start point of a prediction direction and positioned at the opposite side. It may be an example (e.g., w1 and w2 are 0) on a weight setting based on how much it is changed from a reference pixel in a prediction direction of a target pixel. For a diagonal mode in a left-bottom direction, related explanation may be derived in the mode, so detailed explanation is omitted.

FIGS. 9A and 9B are exemplary diagrams on a modification method based on multiple reference pixel lines according to an embodiment of the present disclosure.

The after-mentioned example may be a configuration which may be supported separately from a configuration that a reference pixel line which will be used for intra prediction is selected in the above-mentioned plural reference pixel lines and it will be described based on it, but it may be also applied to an inter-combined configuration.

In reference to FIG. 9A represents an example on modification in a horizontal or vertical mode. In detail, it may be an example on a case in which a reference pixel in two or more reference pixel lines is used for modification.

When the prediction mode of a target block is a vertical mode, the accuracy of modification may be improved by additionally setting a* as a reference pixel. Alternatively, a** may be obtained by applying a weight average to a and a* to apply it to the above-mentioned modification equation.

As block partition may not be performed to have a boundary which accurately divides image characteristics, it may be the same reason as using a reference pixel adjacent to a target block as a prediction pixel.

When the prediction mode of a target block is a horizontal mode, the accuracy of modification may be improved by additionally setting b* as a reference pixel for b and b** may be obtained by applying a weight average to b and b* to apply it to the above-mentioned modification equation.

In reference to FIG. 9B represents an example on modification in a diagonal mode. In detail, it may be an example on a case in which a reference pixel in two or more reference pixel lines is used for modification.

When the prediction mode of a target block is a left-bottom direction, the accuracy of modification may be improved by additionally setting a* as a reference pixel for a at a start point of prediction or a** may be obtained by applying a weight average to a and a* to apply it to the above-mentioned modification equation.

In addition, the accuracy of modification may be improved by additionally setting b* as a reference pixel for b at a position opposite to a start point of prediction or b** may be obtained by applying a weight average to b and b* to apply it to the above-mentioned modification equation.

For a diagonal mode, a reference pixel obtained based on one or more reference pixels at a start point of prediction or at a position opposite to a start point. In this case, the reference pixel may be selected for a pixel in a direction of a prediction mode.

In the above example, when a reference pixel on multiple reference pixel lines is used for modification, whether to support may be determined based on an image type, a color component, the state information of a target block, an intra prediction mode, whether an intra prediction mode in a sub-block unit is applied, reference pixel line selection information, etc.

FIG. 10 is a flow chart showing the modification method of intra prediction according to an embodiment of the present disclosure.

In reference to FIG. 10, an arbitrary pixel for the modification of a target block may be obtained (S900), a modification setting may be determined based on a target block and an intra prediction mode (S910) and the modification of a prediction block may be performed (S920).

For the modification of a prediction block, a block adjacent to a target block may be configured while being skewed in a specific direction (e.g., in a left-top direction), which is generated by the coding order according to a raster scanning or Z-scanning method.

In addition to performing prediction and modification for a reference pixel skewed in a specific direction, the accuracy of prediction may be improved by using data in a region where coding is not completed. For it, a process of obtaining an arbitrary pixel may be performed. In this case, the number of arbitrary pixels may be an integer such as 1, 2 or more.

For example, an arbitrary pixel used for the modification of a target block may be determined among aa to ii pixels in FIG. 8. In detail, a pixel which belongs to a region where coding is not completed yet among blocks adjacent to a target block may be set as an arbitrary pixel.

Alternatively, it may be determined among a to p pixels in FIG. 8. In detail, as a target block also belongs to a pixel which is not encoded yet, it may be included in a target selected as an arbitrary pixel.

FIGS. 11A, 11B, 11C, 11D and 11E are exemplary diagrams on an arbitrary pixel used to modify a prediction pixel according to an embodiment of the present disclosure.

In reference to FIGS. 11A, 11B, 11C, 11D and 11E, exemplary diagrams are shown in which for FIG. 11A, a right-bottom pixel in a target block, for FIG. 11B, a right-bottom pixel outside a target block, for FIG. 11C, a bottom and left pixel outside a target block, for FIG. 11D, a bottom pixel outside a target block and for FIG. 11E, a right pixel outside a target block is determined as an arbitrary pixel (X, X1, X2).

For whether modification is performed by using an arbitrary pixel, related information may be explicitly generated or implicitly determined. And, even if it is determined to use an arbitrary pixel in a higher unit such as a sequence, a picture, etc., a setting for an arbitrary pixel may be defined based on an image type, a color component, the state information of a target block, a coding mode, an intra prediction mode, whether intra prediction in a sub-block unit is applied, reference pixel line selection information, etc. In addition, setting information related to an arbitrary pixel (e.g., a flag on whether modification is performed by using an arbitrary pixel in a block unit, etc.) may be explicitly generated.

A setting on the arbitrary pixel may be configured by including whether an arbitrary pixel is used (i.e., whether an arbitrary pixel is used for modification), the number, position, etc. of an arbitrary pixel, etc.

In this case, an intra prediction mode performing modification by using an arbitrary pixel may be determined according to whether it belongs to a predetermined prediction mode group. For example, among a Planar, DC, horizontal, vertical, diagonal mode (e.g., a right-top directional mode, a right-bottom directional mode, a left-bottom directional mode, etc. No. 2, 34, 66 mode in FIG. 5) and a color copy mode, the prediction group may be configured. Alternatively, it may be configured by additionally including a prediction mode (e.g., a k-spaced mode based on a directional mode. In this case, k is an integer that an absolute value is 1, 2, 3, 4, or more) derived in the prediction mode group.

A target block that modification is performed by using an arbitrary pixel may be smaller than or the same as a predetermined first threshold size and the first threshold size may mean the maximum size that a target block may have. Alternatively, it may be larger than or the same as a predetermined second threshold size and the second threshold size may mean the minimum size that a target block may have. In this case, the threshold size may be shown as width (W), height (H), W×H, W*H, etc., and W and H may be an integer such as 4, 8, 16, 32 or more and the first threshold size may be larger than or the same as the second threshold size.

In the above explanation, it may be understood that a modification setting which is mentioned through a previous embodiment belongs to or is combined with a lower configuration, so an overlapping explanation is omitted. In the after-mentioned example, it is assumed that an arbitrary pixel is set as FIG. 11A.

As the position of an arbitrary pixel is a region which is not encoded yet, a pixel value at a corresponding position may be obtained by various methods.

For example, data on the position of an arbitrary pixel may be explicitly encoded. A pixel value at a corresponding position may be encoded as it is (e.g., based on bit depth) or a value obtained by a predetermined division value (e.g., quantization. A quantized value is used for modification) may be encoded.

Alternatively, two or more data candidate values on the position of an arbitrary pixel may be obtained in an encoded region adjacent to a target block and may be encoded by configuring index information therefor. In an example, when a total of 2 candidates are supported as a pixel value at the position of an arbitrary pixel is 67, a first candidate value obtained in a region adjacent to a target block (e.g., a top region) is 70 and a second candidate value obtained in a region adjacent to a target block (e.g., a left region) is 85, candidate value selection information (e.g., the first candidate value is selected. A 1-bit flag) may be encoded. In this case, obtaining the candidate value may be mentioned in the after-mentioned example. The candidate value may be supported as much as an integer such as 2, 3, 4 or more.

For the above example, it may be a case in which information on data at a position of an arbitrary pixel is explicitly encoded and data at a position of an arbitrary pixel may be implicitly obtained.

For example, it may be obtained from a reference pixel at a predetermined position or a reference pixel responding or corresponding to the position of an arbitrary pixel. As an example for a predetermined position, it may be obtained from a reference pixel (A, E, M in FIG. 8) at a left-top, top and left position outside a target block and a reference pixel at a (right-top, left-bottom) position based on the width or height of a target block (I, Q in FIG. 8) may be obtained at the position.

In addition, as an example for a reference pixel corresponding to the position of an arbitrary pixel, it may be obtained from a reference pixel corresponding to the x or y component of an arbitrary pixel (e.g., <x, −1>, <−1, y>, <x+y+1, −1>, <−1, x+y+1>, etc.)

The data value of one reference pixel among reference pixels at the position may be obtained just as a data value at the position of an arbitrary pixel or a value derived based on two or more reference pixels may be obtained as a data value at the position of an arbitrary pixel.

For example, a reference pixel at a preset position among a plurality of reference pixels used for the position of an arbitrary pixel may be obtained as a data value at the position of an arbitrary pixel. Alternatively, a value obtained in a predetermined process (e.g., the maximum value, the minimum value, a central value, etc.) among a plurality of reference pixels may be obtained as a data value at the position of an arbitrary pixel. Alternatively, a value obtained in a predetermined process (e.g., a weighted average, etc.) among a plurality of reference pixels may be obtained as a data value at the position of an arbitrary pixel.

The following describes a method of obtaining a data value at the position of an arbitrary pixel based on a plurality of reference pixels. It is assumed that A, E, M in FIG. 8 are used as a reference pixel and in the after-mentioned example, they are referred to as x, y, z.

TABLE 2

| Candidate | 0 | 1 | 2 | 3 | 4 | 5 | 6 |
|---|---|---|---|---|---|---|---|
| Pixel Value | x | y | z | y + z − x | z + (y − x)/2 | y + (z − x)/2 | (y + z)/2 |

No. 0 to 2 candidates in the table mean a case in which a reference pixel at a predetermined position is obtained as a data value at the position of an arbitrary pixel. No. 3 to 6 candidates mean a case for obtaining data at the position of an arbitrary pixel by reflecting the gradient of a target block. In detail, it may correspond to a case in which the gradient of a target block is obtained based on a reference pixel at a preset position.

It should be understood that the example may be an example for an equation derived from a plurality of pixels on the assumption that a target block has a square shape and may be changed and applied according to the aspect ratio of a block. In addition, a data value at the position of an arbitrary pixel may be obtained in various ways without being limited to the example.

FIGS. 12A, 12B, 12C, 12D, 12E and 12F are exemplary diagrams in which modification is performed based on an arbitrary pixel according to an embodiment of the present disclosure.

In reference to FIG. 12A represents an interpolation process with an arbitrary pixel and a reference pixel corresponding to a top block and represents a process in which modification is performed by using a reference pixel in the left, right, top, left-top and right-top direction of a target block obtained from it.

The process may be applied when modification is performed by reflecting the gradient of a reference pixel in a left and right direction when the prediction mode of a target block is a vertical mode. It may be different from an existing case when modification is performed based on the gradient of a reference pixel in a left direction.

In reference to FIG. 12C represents an interpolation process with an arbitrary pixel and a reference pixel corresponding to a left block and represents a process in which modification is performed by using a reference pixel in the top, bottom, left, left-top and left-bottom direction of a target block obtained from it.

The process may be applied when modification is performed by reflecting the gradient of a reference pixel in a top and bottom direction when the prediction mode of a target block is a horizontal mode. It may be different from an existing case when modification is performed based on the gradient of a reference pixel in a top direction.

In reference to FIG. 12E represents an interpolation process with an arbitrary pixel and a reference pixel corresponding to a left and top block and represents a process in which modification is performed by using a reference pixel in the top, bottom, left, right, left-top, right-top, left-bottom and right-bottom direction of a target block obtained from it.

The following represents an equation that a modified pixel is obtained by applying modification to a prediction pixel. In this case, a reference pixel may be configured differently from a previous equation in that an arbitrary pixel or a reference pixel obtained based on an arbitrary pixel is included.

$$Z=(z*w0)+(a*w1)+(b*w2)+(c*w3)+(d*w4)+(e*w5)$$

In this case, Z and Z mean a prediction pixel and a modified pixel, respectively, a to e mean a reference pixel used for modification and w0 to w5 mean a weight applied to modification. According to the number of reference pixels used for modification, the reference pixel and weight may be determined. In this case, a value considering normalization by including 0 may be assigned to a weight.

According to the prediction mode of a target block, the position and number of the reference pixels may be determined and various cases like FIGS. 12A, 12B, 12C, 12D, 12E and 12F may be possible. As other explanation on a modification setting may be derived in a part regarding a previous equation, detailed explanation is omitted.

A case that modification is performed in intra prediction was described through various embodiments. In this case, it was described only in case that modification is performed after obtaining a prediction block, but it may be possible to perform modification after being reflected on an intra prediction process (i.e., a process of generating a prediction block)

In addition, flag information generated in a modification process may be encoded/decoded in a configuration separate from an intra prediction mode, but a configuration combined with or dependent on an intra prediction mode may be possible. In other words, it should be understood that it is not limited to an additional or a subsequent part after an intra prediction process.

The methods according to the present disclosure may be recorded in a computer readable medium after being embodied in a form of a program instruction which may be performed by a variety of computer means. A computer readable medium may include a program instruction, a data file, a data structure, etc. alone or in combination. A program instruction recorded in a computer readable medium may be especially designed and configured for the present disclosure or may be available after being notified to a person skilled in computer software.

An example for a computer readable medium may include a hardware device such as ROM, RAM, Flash memory, etc. which is especially configured to store and perform a program instruction. An example for a program instruction may include a high-level language code which may be run by a computer with an interpreter, etc. besides a machine language code which is made by a compiler. The above-mentioned hardware device may be configured to operate as at least one software module to perform the motion of the present disclosure, and vice versa.

In addition, the above-mentioned method or device may be embodied after all or part of such configurations or functions are combined or separated.

While it was described above by referring to the desirable embodiment of the present disclosure, a person skilled in the relevant field of technology may understand that the present disclosure may be variously modified and changed within a range which is not beyond the idea and region of the present disclosure entered in the following claim.

INDUSTRIAL APPLICABILITY

The present disclosure may be used to encode/decode a video signal.

What is claimed is:

1. An image decoding method performed by an image decoding apparatus (30) having a decoding unit (305) and a prediction unit (310), the image decoding method having steps of:

determining, with the decoding unit (305), an intra prediction mode of a target block;

generating, with the prediction unit (310), a prediction block of the target block based on the intra prediction mode; and modifying, with the prediction unit (310), the prediction block, wherein the intra prediction mode of the target block is determined as a mode within a prediction mode candidate group, wherein when a color component of the target block is a luma component, the prediction mode candidate group has a directional mode and a non-directional mode, wherein, when the color component of the target block is a chroma component, the prediction mode candidate group has the directional mode, the non-directional mode, a color mode and a color copy mode, wherein, when the color component of the target block is a chroma component, the prediction mode candidate group is classified into a first category having the non-directional mode, the directional mode and the color mode and a second category having the color copy mode, and wherein the determining the intra prediction mode of the target block comprises in case the color component of the target block is a chroma component, obtaining first information specifying any one of the first category and the second category;

obtaining second information specifying the intra prediction mode of the target block in the category specified by the first information; and determining, based on the second information, the intra prediction mode of the target block from the category specified by the first information.

2. The method of claim 1, wherein the prediction mode candidate group is classified into more than one categories by considering a maximum number or a priority of a prediction mode for each category.

3. The method of claim 1, wherein the second information is not obtained when only one prediction mode is present in the category according to the first information.

4. The method of claim 1, further having a step of constructing, with the prediction unit (310), a reference pixel used for the intra prediction, wherein the reference pixel belongs to all or part of more than one reference pixel lines supported in a decoding apparatus.

5. The method of claim 4, further having a step of performing, with the prediction unit (310), one or more of a weighted filter or an interpolation filter for the constructed reference pixel.

6. The method of claim 1, wherein the modifying, with the prediction unit (310), the prediction block is selectively performed based on predetermined coding information, wherein the coding information has one or more of an image type, a color component, state information, a coding mode, an intra prediction mode, whether intra prediction in units of sub-blocks is applied or a reference pixel line.

7. An image encoding method performed by an image encoding apparatus (20) having an encoding unit (245) and a prediction unit (200), the image encoding method having steps of:

determining, with the prediction unit (200), an intra prediction mode of a target block;

generating, with the prediction unit (200), a prediction block of the target block based on the intra prediction mode; and modifying, with the prediction unit (200), the prediction block, wherein the intra prediction mode of the target block is determined as a mode within a prediction mode candidate group, wherein when a color component of the target block is a luma component, the prediction mode candidate group has a directional mode and a non-directional mode, wherein, when the color component of the target block is a chroma component, the prediction mode candidate group has the directional mode, the non-directional mode, a color mode and a color copy mode, wherein, when the color component of the target block is a chroma component, the prediction mode candidate group is classified into a first category having the non-directional mode, the directional mode and the color mode and a second category having the color copy mode, and wherein the determining the intra prediction mode of the target block comprises in case the color component of the target block is a chroma component, determining, with the prediction unit (200), any one of the first category and the second category, the determined category being encoded based on first information with the encoding unit (245); and determining, with the prediction unit (200), the intra prediction mode of the target block in the determined category, the determined intra prediction mode being encoded based on second information with the encoding unit (245).

8. A method of transmitting a bitstream generated by an image encoding apparatus (20) having an encoding unit (245) and a prediction unit (200), the method having steps of:

obtaining the bitstream; and transmitting the bitstream to an image decoding apparatus, wherein the bitstream is generated by performing steps of, determining, with the prediction unit (200), an intra prediction mode of a target block;

generating, with the prediction unit (200), a prediction block of the target block based on the intra prediction mode; and modifying, with the prediction unit (200), the prediction block, wherein the intra prediction mode of the target block is determined as a mode within a prediction mode candidate group, wherein when a color component of the target block is a luma component, the prediction mode candidate group has a directional mode and a non-directional mode, wherein, when the color component of the target block is a chroma component, the prediction mode candidate group has the directional mode, the non-directional mode, a color mode and a color copy mode, wherein, when the color component of the target block is a chroma component, the prediction mode candidate group is classified into a first category having the non-directional mode, the directional mode and the color mode and a second category having the color copy mode, and wherein the determining the intra prediction mode of the target block comprises in case the color component of the target block is a chroma component, determining, with the prediction unit (200), any one of the first category and the second category, the determined category being encoded based on first information with the encoding unit (245); and determining, with the prediction unit (200), the intra prediction mode of the target block in the determined category, the determined intra prediction mode being encoded based on second information with the encoding unit (245).

* * * * *